United States Patent
Ouyang et al.

(10) Patent No.: US 12,164,931 B2
(45) Date of Patent: Dec. 10, 2024

(54) AI INTELLIGENTIALIZATION BASED ON SIGNALING INTERACTION

(71) Applicant: ASIAINFO TECHNOLOGIES (CHINA), INC., Beijing (CN)

(72) Inventors: Ye Ouyang, Beijing (CN); Le Jiang, Beijing (CN); Aidong Yang, Beijing (CN); Xiangde Meng, Beijing (CN); Qin Jing, Beijing (CN)

(73) Assignee: ASIAINFO TECHNOLOGIES (CHINA), INC., Beijing (CN)

( * ) Notice: Subject to any disclaimer, the term of this patent is extended or adjusted under 35 U.S.C. 154(b) by 238 days.

(21) Appl. No.: 17/790,019

(22) PCT Filed: Dec. 31, 2019

(86) PCT No.: PCT/CN2019/130461
§ 371 (c)(1),
(2) Date: Jun. 29, 2022

(87) PCT Pub. No.: WO2021/134459
PCT Pub. Date: Jul. 8, 2021

(65) Prior Publication Data
US 2023/0066178 A1    Mar. 2, 2023

(51) Int. Cl.
*G06F 9/445* (2018.01)
(52) U.S. Cl.
CPC ................ *G06F 9/44505* (2013.01)
(58) Field of Classification Search
CPC ........................................ G06F 9/445
See application file for complete search history.

(56) References Cited

U.S. PATENT DOCUMENTS

| 11,165,648 | B1* | 11/2021 | Bollineni | ............... | H04L 41/16 |
| 11,490,705 | B2* | 11/2022 | Vasileiadis | ......... | G07C 9/00563 |
| 2003/0043180 | A1* | 3/2003 | Gusler | .................... | G06F 9/453 |
| | | | | | 715/708 |
| 2018/0232741 | A1 | 8/2018 | Jadhav et al. | | |
| 2019/0028591 | A1* | 1/2019 | Kumar | .................... | G06F 9/547 |

(Continued)

FOREIGN PATENT DOCUMENTS

| CN | 107704252 A | 2/2018 |
| CN | 108628607 A | 10/2018 |

(Continued)

OTHER PUBLICATIONS

International Search Report and Written Opinion filed in WO20211134459; dated Sep. 8, 2020; 6 pgs.

*Primary Examiner* — Phil K Nguyen
(74) *Attorney, Agent, or Firm* — Vedder Price P.C.

(57) ABSTRACT

An electronic device (400) on an artificial intelligence (AI) platform side, the AI platform is capable of interacting with an application side to perform at least one AI intelligentialization process with the same application configuration, the electronic device (400) includes a processing circuitry (402) which is configured to: receive a configuration request for the at least one AI intelligentialization process from an application side, the configuration request including information indicating the application configuration; and when the application configuration is satisfied, assign the application configuration for usage by the at least one AI intelligentialization process during execution.

17 Claims, 12 Drawing Sheets

(56) References Cited

U.S. PATENT DOCUMENTS

| | | | |
|---|---|---|---|
| 2019/0042955 A1* | 2/2019 | Cahill | G06N 5/04 |
| 2019/0086988 A1* | 3/2019 | He | G06F 1/3212 |
| 2019/0156222 A1 | 5/2019 | Emma et al. | |
| 2020/0111490 A1* | 4/2020 | Jang | G10L 15/22 |
| 2020/0143017 A1* | 5/2020 | Yoon | G06F 3/167 |
| 2021/0056436 A1* | 2/2021 | Shah | G06N 20/00 |
| 2021/0174163 A1* | 6/2021 | Verma | G06V 10/765 |

FOREIGN PATENT DOCUMENTS

| | | |
|---|---|---|
| CN | 108881446 A | 11/2018 |
| CN | 109408500 A | 3/2019 |
| CN | 110263653 A | 9/2019 |

\* cited by examiner

AI INTELLIGENTIALIZATION BASED ON SIGNALING INTERACTION

FIELD OF THE INVENTION

The present invention belongs to a field of artificial intelligence, and particularly relates to AI intelligentialization.

BACKGROUND

Artificial Intelligence (briefly referred to as AI) is a new technical science that researches and develops theories, methods, technologies and application systems for simulating, extending and expanding human intelligence. With the rise of Internet and big data, AI has further landed in the fields of security, automotive, medical, smart home and smart manufacturing, and various open or general-purpose AI platforms have emerged. As a basic, independent computing engine, AI platform provides intelligent services for application systems. The process by which the AI platform provides intelligent services for application systems is called "intelligentialization (注智)" in the industry.

AI platform needs to perform various operations when applying intelligentialization to an application system. Among others, the important stages (环节) are model training and model prediction. Through interaction processes for training or prediction, a conversion from "data" to "knowledge" can be realized. Currently, a main way to support implementation of interaction processes for training or prediction by the AI platform is Open API.

FIG. 1 illustrates a schematic diagram of an AI platform performing intelligentialization for an application system in a model prediction stage. Among them, under the Open API process framework, the application system submits data to be tested and application scenario information to the AI platform. The AI platform provides required models and computing resources for the data to be tested, performs corresponding prediction operations, and returns corresponding identification results and status.

In a specific implementation of the intelligentialization process in the model prediction stage, an application side initiates a prediction request to the AI platform, and the AI platform receives the prediction request from the application side and performs a model validity check. When the model is valid, the AI platform loads the valid model into memory, and then completes the model prediction by using manually allocated CPU, GPU and other resources to obtain prediction result. After that, the AI platform returns the prediction result and status to the application side via a prediction response. The application side processes the received prediction result and status. If there is no abnormity in the status, the application side analyzes the prediction result and initiates the next prediction. Conversely, if there is an abnormity, human operators will participate in troubleshooting and recovering.

FIG. 2 illustrates a process of a prior-art AI platform performing intelligentialization for an application system in the model prediction stage, including two face recognition prediction processes and one mobile number portability prediction process.

As shown in the figure, in "Face Recognition Prediction Signaling (the First Time)", the application side firstly initiates a face recognition request; the AI platform receives the face recognition request from the application side, performs model validity check, model load operation and resource allocation, then use the model and allocated resources to perform computations for face recognition, and return the face recognition results and status via a face recognition response.

The application side analyzes the recognition status in the received face recognition results. If there is no abnormity, the application side can initiate the next prediction recognition in the manner as described above, as shown in the "Face Recognition Prediction Signalling (the Second Time)", or "Mobile Number Portability Signalling (the First Time)". On the contrary, if the application side recognizes an abnormal status in the received face recognition result, human operators will participate in troubleshooting and recovering, as shown in the "Status Diagnosis Signalling" shown in the figure. After that, the next prediction is to be initiated in the manner as described above.

However, there are a lot of redundant steps and manual intervention in the current AI platform intelligentialization process, which leads to reduction of efficiency. Therefore, how to improve the efficiency of the AI platform intelligentialization has brought new challenges to the design of the AI platform and has become the focus of research in the AI field.

Unless otherwise stated, it should not be assumed that any of the methods described in this section are prior art simply by being included in this section. Also, unless otherwise stated, issues recognized with respect to one or more methods should not be assumed as being recognized in any prior art on the basis of this section.

DISCLOSURE OF THE INVENTION

The present disclosure proposes an improved AI intelligentialization, especially AI resource allocation, based on signaling transmission. And by means of signaling transmission between an application side and an AI platform, the improved application configuration control is achieved, the work efficiency is increased, and the cost of manual intervention in the status diagnosis process is reduced.

One aspect of the present disclosure relates to an electronic device on an AI platform side, the AI platform is capable of interacting with an application side to perform at least one AI intelligentialization process with the same application configuration, the electronic device includes a processing circuitry which is configured to: receive a configuration request for the at least one AI intelligentialization process from an application side, the configuration request including information indicating the application configuration; and when the application configuration is satisfied, assign the application configuration for usage by the at least one AI intelligentialization process during execution.

Another aspect of the present disclosure relates to an application-side electronic device, the application side is capable of performing signaling interaction with an AI platform side to perform at least one AI intelligentialization process with the same application configuration, the application-side electronic device including a processing circuitry which is configured to send an electronic device on the AI platform side a configuration request for the at least one AI intelligentialization process, the configuration request including information indicating the application configuration, receive response information from the electronic device on the AI platform side indicating that the application configuration is satisfied, and send an operation request to the electronic device on the AI platform side to perform the at least one AI intelligentialization process without any further configuration request Yet another aspect of the present disclosure relates to a method on an AI platform side, the AI platform is capable of interacting with an application side to perform at least one AI intelligentialization process with the same application configuration, the method comprises: a receiving step of receiving a configuration request for the at least one AI intelligentialization process from an application side, the configuration request including information indicating the application configuration; and an assigning step of, when the application configuration is satisfied, assigning the application configuration for usage by the at least one AI intelligentialization process during execution.

Yet another aspect of the present disclosure relates to an application-side method, the application side is capable of performing signaling interaction with an AI platform side to perform at least one AI intelligentialization process with the same application configuration, the method comprising: a first sending step of sending an electronic device on the AI platform side a configuration request for the at least one AI intelligentialization process, the configuration request including information indicating the application configuration, a receiving step of receiving response information from the electronic device on the AI platform side indicating that the application configuration is satisfied, and a second sending step of sending an operation request to the electronic device on the AI platform side to perform the at least one AI intelligentialization process without any further configuration request.

Yet another aspect of the present disclosure relates to a non-transitory computer-readable storage medium storing executable instructions that, when executed, implement the method as previously described.

Yet another aspect of the present disclosure relates to a device. According to an embodiment, the device includes a processor and a storage device, and the storage device stores executable instructions that, when executed, implement the method described above.

This section is provided to introduce some concepts in a simplified form that will be further described below in the detailed description. This section is not intended to identify key features or essential features of the claimed subject matter, nor is it intended to be used to limit the scope of the claimed subject matter. Other aspects and advantages of the technology will become apparent from the following detailed description of the embodiments and the accompanying drawings.

DESCRIPTION OF THE DRAWINGS

The above and other objects and advantages of the present disclosure will be further described below with reference to specific embodiments and with reference to the drawings.

In the drawings, the same or corresponding technical features or components will be denoted by the same or corresponding reference symbols.

Figure 1:
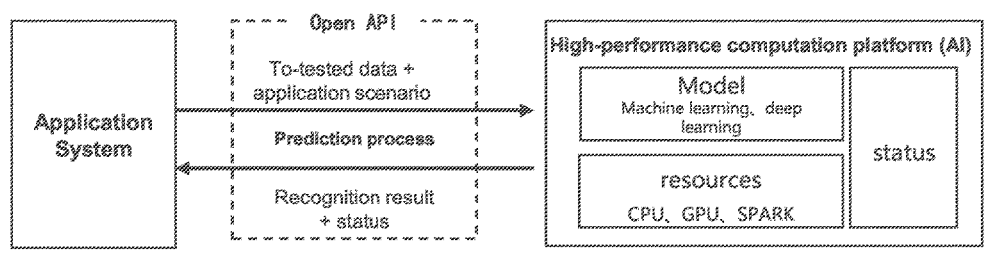
FIG. 1 illustrates a basic conceptual diagram of intelligentialization by an AI platform for an application system.
Figure 2:
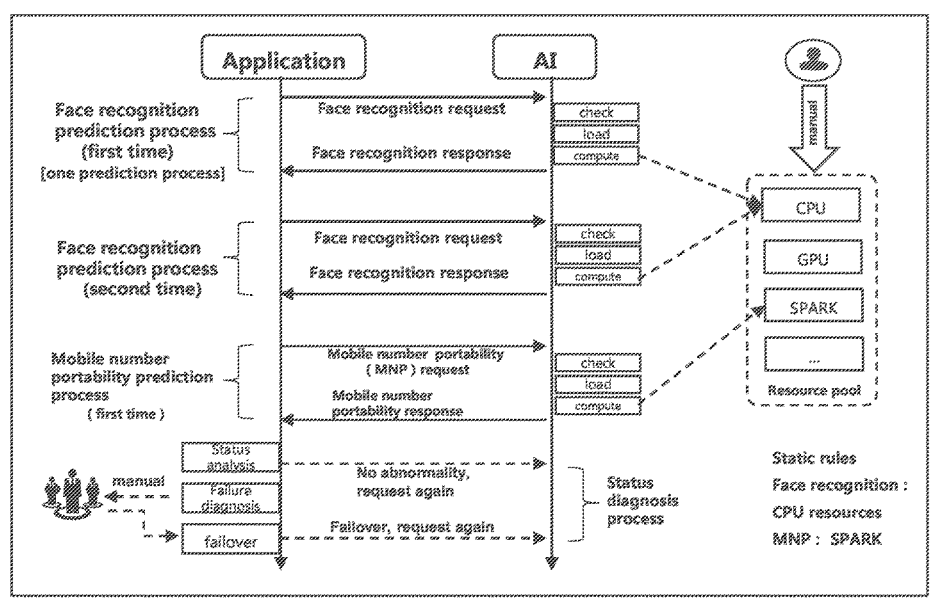
FIG. 2 illustrates a process of the prior-art AI platform intelligentialization with a model prediction stage as an example.

The embodiments described in this section may be susceptible to various modifications and alternative forms, and specific embodiments thereof are shown by way of example in the drawings and are described in detail herein. It should be understood, however, that the drawings and detailed description thereof are not intended to limit the embodiments to the disclosed particular forms, but rather, the intention is to cover all modifications, equivalents, and alternatives falling within the spirit and scope of the claims.

DETAILED DESCRIPTION OF PREFERRED EMBODIMENTS

Hereinafter, exemplary embodiments of the present disclosure will be described with reference to the accompanying drawings. For clarity and conciseness, not all features of an embodiment are described in the specification. However, it should be understood that many implementation-specific settings must be made during the implementation of the embodiment in order to achieve specific goals of the developer, for example, to meet those restrictions related to equipment and business which may change depending on the implementation. In addition, it should also be understood that, although development work may be very complex and time-consuming, it is only a routine task for those skilled in the art benefiting from this disclosure.

Here, it should also be noted that, in order to avoid obscuring the present disclosure by unnecessary details, only processing steps and/or equipment structures that are closely related to at least the solution according to the present disclosure are shown in the drawings, while other details of little relevance to this disclosure are omitted.

As mentioned earlier, there are a lot of redundant steps and manual intervention in the prior-art AI intelligentialization process, which leads to large operating costs and reduced efficiency. The defects in the prior-art AI intelligentialization process will be described in detail below with reference to FIG. 3, which illustrates shortcomings in the prior-art AI intelligentialization process with the model prediction stage as an example, and there mainly exist three shortcomings as follows:

1. Large Operation Overhead and Long Response Time

Figure 3:
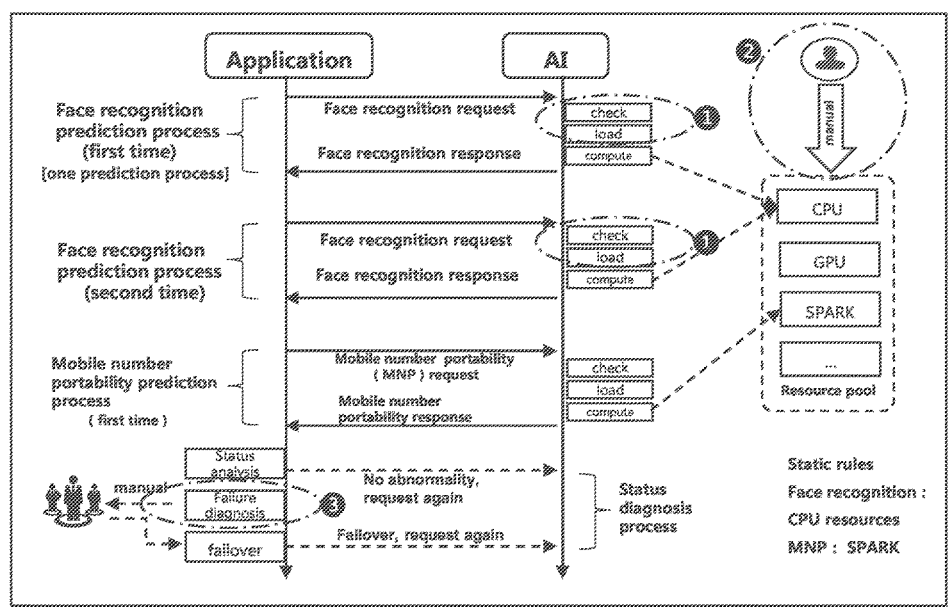
FIG. 3 illustrates shortcomings in the prior-art AI platform intelligentialization process with a model prediction stage as an example.

In the prior-art AI intelligentialization process, before each computation process, it needs to check and load the model, that is, to check the validity of the model, such as whether an optimization update shall occur, and to load the model, as shown by ① in FIG. 3. Frequent checking and loading operations require a lot of time and memory resources, which increases the system's operating overhead and results in long response time.

2. Static Resource Allocation and Lack of Adaptation Mechanism

The resources used in the computational operations in the prior-art AI intelligentialization process are set through a background "static" allocation. In other words, the used resources are manually set and always fixed, and even if there are other available hardware resources in the resource pool, the resource allocation cannot be performed in real time and flexibly, as shown by ② in FIG. 3.

For example: theoretically, CPU and GPU resources can be chosen for the face recognition model prediction. However, when the background allocation is a CPU, the background allocation will remain unchanged during the face recognition model prediction process, and neither the application system nor the AI platform can freely choose GPU to participate in the computation.

3. Poor Perception Ability and Increased Labor Cost

From the perspective of the prior-art mainstream centralized AI platform, there are two main types of status mechanisms provided to the application side: legacy network status code and custom service status code. But they all have their own problems:

1) The legacy network status code (such as 400, 401, etc.) cannot truly reflect the service logic and influence location of failure;

2) custom service status code (such as: 1111 is "Insufficient Resources", 1112 is "Abnormal Data", etc.), but an abnormal status indication control lacks.

All these problems lead to too many manual intervention during failure diagnosis in the intelligentialization process, which greatly reduces the efficiency of AI prediction or training, as shown by ③ in FIG. 3.

As application scenarios become more complex, demands for AI intelligentialization services have also increased accordingly, and new demands have been raised in particular for response speed, resource adaptation, and failure diagnosis. Therefore, in view that there are shortcomings that significantly affect the efficiency of the AI platform intelligentialization process, this disclosure proposes an improved AI platform intelligentialization based on signaling transmission, especially an improved configuration for AI intelligentialization with respect to an application.

According to the disclosure, AI intelligentialization or AI platform intelligentialization can refer to providing intelligence for an application to be executed by an application system, that is, intelligentialization for an application, here the application can include face recognition, mobile number portability, etc., and may include other types of applications. For each application, the AI platform intelligentialization process according to the present disclosure includes, but is not limited to, an application model training process (for example, for an application to be executed by an application system, training a model for the application), an application model utilization process (utilizing a trained or preset application model to execute the application, such as the aforementioned model prediction process) and so on.

Signaling transmission for the AI intelligentialization process according to the present disclosure may refer to signal transmission and/or reception between the application side and the AI platform for connecting the application model, the resources required by the application, the application status information/codes, and so on, so as to provide convenient and efficient intelligentialization service. Preferably, the signaling transmission of the AI intelligentialization process according to the present disclosure may be an signaling transmission of application configuration information required when the AI intelligentialization process is executed for the application and the configuration required may means configuration/settings for elements required for executing the AI intelligentialization process, such as models, resources, and other elements necessary for such execution. This information may be referred to as application configuration information which can include information on configuration for the aforementioned application model training process, application model utilization process, so on, such as, information related to resource configuration, model configuration, etc. Of course, it can also be information on other configurations required when the AI intelligentialization process is performed for the application.

The signalling transmission of the AI intelligentialization process according to the present disclosure may refer to various forms of signal transmission between the application side and the AI platform. As an example, it may include bidirectional signal transmission between the application side and the AI platform. For example, the application side sends a request signal to the AI platform, the AI platform sends a response signal to the application or a third party, etc. As another example, it can include a unidirectional signal transmission between the application and the AI platform, for example, the application sends a request to the AI platform and the AI platform sends the corresponding response information to the application side. In this case, the signaling transmission can be called signaling interaction. As an example, the signals mentioned here include application configuration information, application operation-related information, system status-related information, etc., which will be described in detail below in conjunction with embodiments.

According to one aspect of the present disclosure, the configuration signaling transmission between the application and the AI platform can optimize at least one AI intelligentialization process with the same application configuration for an application, where the application configuration may include at least resource configuration required for execution of the AI intelligentialization process. and additionally, can also include model configuration required for execution of the AI intelligentialization process. In particular, the AI platform pre-satisfy the configuration required for execution of the at least one AI intelligentialization process according to a configuration request from the application side, so that the configuration can be used fixedly in each AI intelligentialization process, eliminating existing redundant operations, such as model checking/loading and resource binding, etc. need to be performed in each AI intelligentialization process in the prior art, which saves work overhead and improves efficiency.

According to another aspect of the present disclosure, the configuration signaling transmission between the application side and the AI platform can dynamically adjust the configuration required for execution of the AI intelligentialization process for an application. As an example, the dynamic adjustment may involve at least dynamic resource adjustment. In particular, the AI platform can dynamically allocate resources for the application according to specific parameters in the configuration request from the application side, or notify the application side of available resource status in the current resource pool via response information so that the application side can determine whether to adjust the resource configuration or not, so that optimized resource allocation can be achieved.

According to yet another aspect of the present disclosure, the AI platform can report status monitoring information to the application side through signaling transmission with the application side, the status monitoring information indicates current status by coded fields, so that the application side can automatically identify codes of the fields in the status monitoring information, judge the status type accordingly, and execute the corresponding processing operations, so as to realize automatic processing in the status diagnosis process, reduce the cost of manual intervention, and improve the efficiency of the intelligentialization process.

Hereinafter, embodiments according to the present disclosure will be described in detail with reference to the accompanying drawings. It should be noted that the operations performed by the AI platform according to the embodiments of the present disclosure may be implemented by an electronic device on the AI platform side, which may be separated from the AI platform, may be a part of the AI platform, such as a component, member, etc. thereof, or even may also be the AI platform per se. The operations performed by the application side according to the embodiments of the present disclosure may be implemented by an electronic device on the application side. The electronic device may be separated from the application side, may be a part of the application side, such as a component, member, etc. thereof, or even may be the application side per se. Therefore, the operations performed by the AI platform side and the application side mentioned in the following description can be performed correspondingly via the electronic device for the AI platform side and the electronic device for the application side respectively.

Figure 4A:
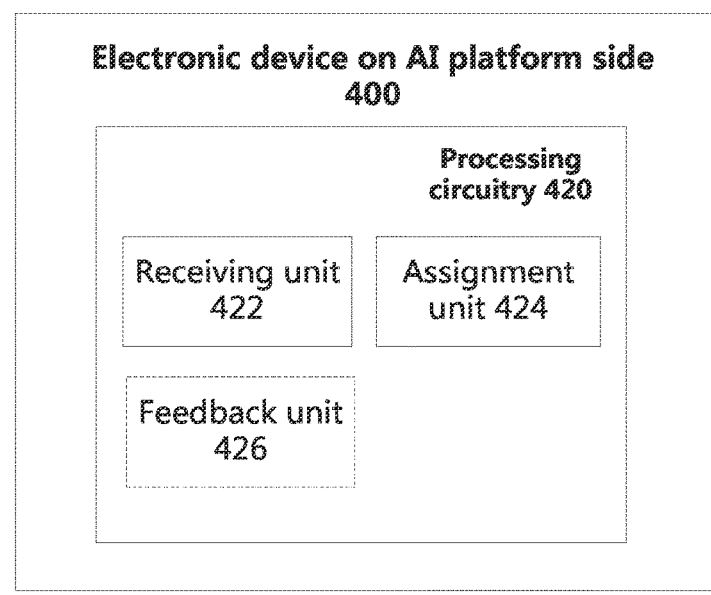
FIG. 4A illustrates a block diagram of an electronic device on an AI platform side according to an embodiment of the present disclosure.

FIG. 4A illustrates a block diagram of an electronic device on an AI platform side according to an embodiment of the present disclosure. The AI platform can interact with an application side to perform at least one AI intelligentialization process with the same application configuration. The electronic device 400 includes a processing circuitry 420, and the processing circuitry 420 may be configured to receive a configuration request for the at least one AI intelligentialization process from an application side, the configuration request including information indicating the application configuration; and when the application configuration can be satisfied (for example, elements indicated by or corresponding to the application configuration are available), provide the application configuration for usage by the at least one AI intelligentialization process during execution.

According to one embodiment, the application configuration may include at least a resource configuration, and thus the information indicating the application configuration may indicate resources required for execution of the at least one AI intelligentialization process. Therefore, if the requested resources are available, the resources can be allocated for the at least one AI intelligentialization process, so that in subsequent operations, the at least one AI intelligentialization process can be executed by fixedly using the allocated resources.

The information indicating the resource configuration may be provided in various ways. As an example, the information indicating the resource configuration may include at least a type of resources required to execute the AI intelligentialization process, and may also include the quantity of resources and/or the serial number of the resources, which may be in the form of a list or in any other appropriate form. For example, the types of resources may include types of physical or virtual resources which can be used for application model training and utilization, such as CPU, GPU, SPARK, memory, etc. As an example, judging whether the resource configuration is satisfied may include judging whether the resources to be allocated are currently idle in the resource pool, and when the resources are idle, it can be judged that the resource configuration is satisfied. As an example, when the resource configuration indicates that N CPUs are needed, or the Nth CPU is needed, while there are N CPUs in the resource pool that are idle, or the Nth CPU is idle, the resources to be allocated can be considered as available.

According to an embodiment, the application configuration may further include a model configuration, so the information indicating the application configuration may indicate a model required for execution of the at least one AI intelligentialization process, and if the requested model is available, the model can be located into resources allocated for the at least one AI intelligentialization process, so that in subsequent operations, the at least one AI intelligentialization process can be executed by fixedly using the loaded model and resources. The resources mentioned here may be the same as or different from the application resources as mentioned above, and generally refer to storage resources, such as memory.

The information indicating the model configuration may be provided in various ways. As an example, the information indicating the model configuration may include at least a type of the model (for example, a model used for face recognition, a model used for mobile number portability, etc.), an ID of the model, and the like. As another example, in a case where a model ID corresponds to a model type, only the model ID may be included and thus the model type can be directly derived therefrom. As an example, judging whether a model is available includes checking the model, for example, when the model can be retrieved from a model library and the state of the model is stable, the model is considered to be valid and available. The stable state of the model can refer to that the model has been already updated and no optimization nor update are required. Of course, the validity of the model can also be indicated by other indicators known in the art, which will not be described in detail here.

According to another embodiment, additionally or alternatively, the configuration request may include at least information indicating an application scenario of the AI intelligentialization process. As an example, the information may include at least one of an application scenario name, an application scenario ID, application scenario parameters, and the like. According to one embodiment, the application scenario may be associated with the resource configuration for the AI intelligentialization process in advance. For example, an application scenario may correspond to a specific resource configuration. Therefore, when the application scenario is indicated in the configuration request, the AI platform can identify the corresponding resource requirements and perform resource allocation accordingly, it should be noted that in this case, the information on the application scenario can be used as information indicating the resource configuration, and thus the information indicating the resource configuration as described above can be omitted. According to another embodiment, the application scenario may be associated with a specific model configuration in advance. For example, an application scenario may correspond to a specific model. Therefore, if the application scenario is indicated in the configuration request, the AI platform can identify the corresponding model requirement and perform model allocation (such as, check, binding, etc.) accordingly. It should be noted that in this case, the information on the application scenario can be used as information indicating the model configuration, and the information indicating the model configuration as described above can be omitted.

According to the embodiment, the same application configuration may refer to the same configuration required for execution of the AI intelligentialization process, such as the same resource configuration, the same model configuration, and so on. As an example, at least one AI intelligentialization process with the same application configuration may refer to the AI intelligentialization process executed in the same stage for the same application scenario, such as the face recognition model training process, face recognition model utilization process (that is, face recognition process corresponding to the aforementioned face recognition prediction process), the mobile number portability model training process, the mobile number portability model utilization process (corresponding to the aforementioned mobile number portability prediction process), and so on. However, it should be noted that at least one AI intelligentialization process with the same application configuration can also correspond to at least one of different application scenarios or different stages in the same application scenario, as long as the resource and/or model configuration required for execution of these AI intelligentialization process are the same.

It should be noted that the above-mentioned transmission of the application configuration request between the application side and the AI platform may be performed before the at least one AI intelligentialization process starts. Thus, where the requested configuration is satisfied, the configuration can be assigned to the at least one AI intelligentialization process so as to be utilized for each AI intelligentialization process fixedly/constantly. For example, the requested resources may be fixedly used for at least one AI intelligentialization process for the application model training, and the requested resources and models may be fixedly used for at least one AI-intelligence process for the application model utilization/prediction.

According to one embodiment, the AI platform may feedback configuration result for the application configuration request to the application side. As an example, the configuration result may be included in a response information transmitted by the AI platform to the application side, and the response information may correspond to the foregoing configuration request. In this case, the configuration request and response belong to a part of the configuration signaling interaction. According to an embodiment, in addition to indicating whether the requested configuration is satisfied, the configuration result may also indicate resource configuration information. According to an embodiment, the processing circuitry is further configured to, when the requested application configuration is satisfied, feedback to the application side information that indicates that the requested application configuration is satisfied, so that upon receiving the information, the application side can request to perform the at least one AI intelligentialization process without submitting a configuration request for each AI intelligentialization process. According to another embodiment, if the application side does not receive a response from the AI platform with respect to the application configuration request within a certain period of time, the application side will repeatedly send the configuration request to the AI platform until it receives the application configuration result fed back by the AI platform.

According to an embodiment, the processing circuitry is further configured to, upon receipt of a request from the application side for executing the at least one AI intelligentialization process, execute the at least one AI intelligentialization process by directly using the application configuration that has been assigned to the at least one AI intelligentialization process. And the execution results can be feedback to the application side. It should be noted that this request no longer includes a request for application configuration (such as resource configuration, model configuration, etc.). For example, after the resources and model configuration for at least one face recognition process have been assigned, the application side sends requests for the at least one face recognition process to the AI platform, and the AI platform can directly apply the allocated resources and the models loaded into the resources to perform face recognition.

According to an embodiment, the processing circuitry is further configured to receive an application resource release request from an application side for the at least one AI intelligentialization process, release resources for the at least one AI intelligentialization process, and notify the application side of the release result as a response. Therefore, the application side can perform signaling interaction with the AI platform to release the currently used resources, so that the resources can be idle for being utilized for subsequent application operations.

Figure 5:
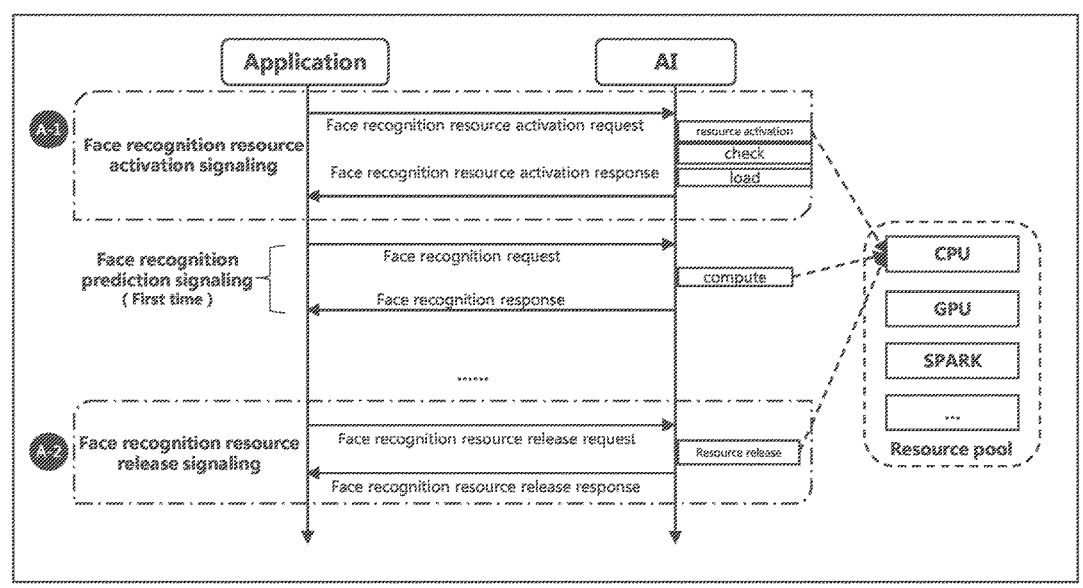
FIG. 5 illustrates an AI intelligentialization operation process according to an embodiment of the present disclosure in which resource control signaling interaction is added.

Hereinafter an AI intelligentialization operation process incorporating resource control signaling interaction according to an embodiment of the present disclosure will be exemplarily explained with reference to FIG. 5, where FIG. 5 schematically illustrates a face recognition process in the AI intelligentialization operation. Here, the resource control signaling is an example of the aforementioned configuration signaling, and is a resource allocation signaling for an intelligentialization process of face recognition. The resource control signaling includes face recognition resource activation signaling and face recognition resource release signaling, and each signaling includes a request and response process.

In FIG. 5, "A-1" corresponds to the resource activation signaling interaction before the face recognition prediction signaling interaction, and it requests resource allocation/activation before the face recognition, so that a model for "face recognition prediction" can be loaded and bound with required resources; therefore, in subsequent face recognition prediction processes, the bound resources and models can be directly used for computation, without having to check and load the models for each process, thereby reducing redundant operations. The A-1 resource activation signaling interaction includes a face recognition resource activation request and a face recognition resource activation response.

Moreover, "A-2" corresponds to a face recognition resource release signaling interaction, including a face recognition resource release request and a face recognition resource release response. When face recognition prediction is no longer needed, the model for "face recognition prediction" is unbound from the corresponding resources, and the resources are returned to the resource pool and available for invocation by other needs.

Figure 6:
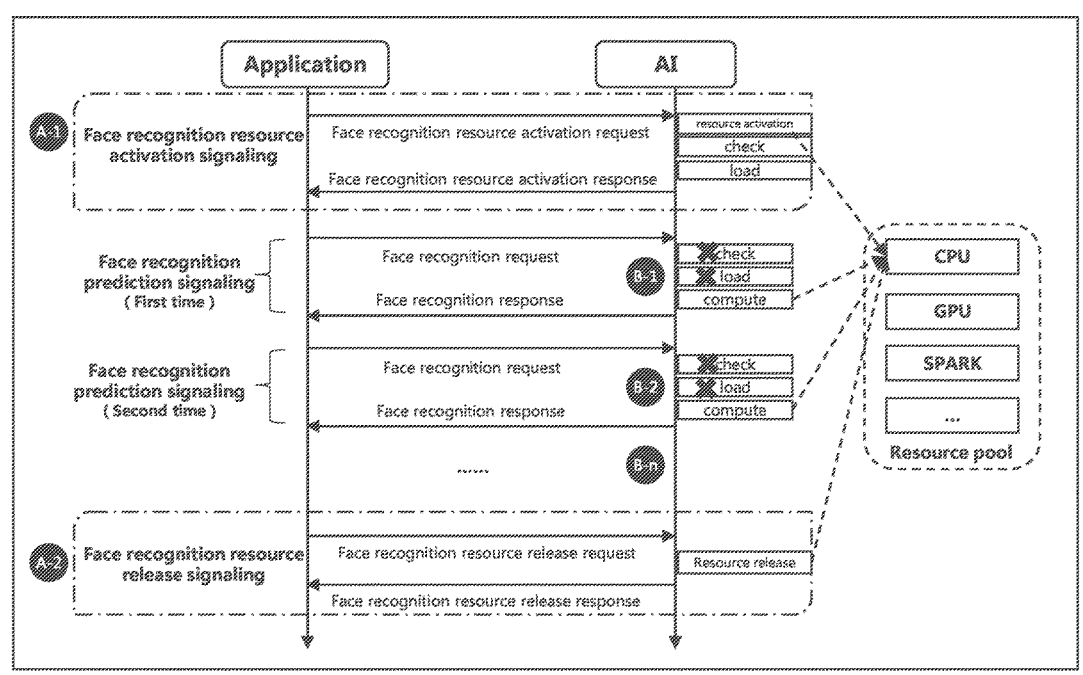
FIG. 6 illustrates a face recognition process using resource control signaling according to an embodiment of the present disclosure.

Hereinafter the AI intelligentialization configuration and operation flow according to the embodiment of the present disclosure will be described in detail by taking a face recognition prediction stage as an example with reference to FIG. 6.

First, the A-1 process is performed, and the "face recognition resource activation signaling" interaction is performed between the application side and the AI platform. The application side initiates a face recognition resource activation request to the AI platform, which includes AI model information and AI resource configuration information. The AI platform receives the request, obtains resources based on the AI resource configuration information, checks and loads the model according to the AI model information, and binds the model to the resources. Then, the AI platform sends a response to the application ("Face recognition resource activation response"). In this example, an information indicating both the model and the resources are available is included in the response. Here, the AI model information and the AI resource configuration information may be examples of the information indicating the model configuration and the information indicating the resource configuration described above respectively, and they will be described in more detail by way of examples below.

Next, there is a "face recognition prediction signaling" interaction between the application side and the AI platform to implement face recognition (as an exemplary application) by means of the AI platform. Among them, face recognition is performed n times, indicated by B-1, B-2, . . . , B-n, n is an integer greater than or equal to 1, and the operations in each face recognition are basically the same.

First, according to the received response indicating that the model and resources are available, the application side initiates a face recognition request. The AI platform receives the request and directly uses the bound resources and models to perform face recognition operations. The AI platform uses a face recognition response to notify the application side of the face recognition prediction results, including the recognition results and possible status information. Thus, the first face recognition prediction signaling interaction is completed, that is, the first face recognition is performed. After receiving the recognition prediction result, the application side analyzes it, and if there is no abnormity in the result, executes the next face recognition prediction signaling interaction in the manner as described above, such as B-2. On the other hand, if an abnormity is found, it goes to a "status diagnosis process" (not shown), where based on information on the abnormity, failure diagnosis and failover are performed, and the prediction signaling interaction can be requested again after the failover.

Thus, n face recognition prediction signaling interactions are sequentially performed until face recognition is completed (for example, the nth face recognition prediction signaling interaction B-n is finished). After that, the A-2 release process is performed, that is, the "face recognition resource release signaling" interaction is performed between the application side and the AI platform, where the application side initiates a face recognition resource release request to the AI platform, and the AI platform receives the request and unbinds the "Face Recognition Prediction" model from the corresponding resources, put the resources back into the resource pool for invocation by other needs, and then notify the application side of the release result via the face recognition resource release response.

As can be seen from the above, by adding the "A-1" configuration control process to implement preliminary configuration assignment/setting for subsequent face recognition operations, such as binding models and resources for the face recognition process according to AI model information and AI resource configuration information, in a case that the AI model information and AI resource configuration information used for at least one face recognition prediction operation remain unchanged, the application system can directly send an operation request to the AI platform to initiate AI intelligentialization for each face recognition prediction, without sending any configuration activation request, and the AI platform directly performs a computation stage to complete the model training or prediction, without performing check and loading operations. It should be noted that the above-mentioned A-1 configuration process and A-2 release process can be applied to other types of applications, such as mobile number portability applications, etc., and are especially advantageous for two or more applications with the same configuration requirements.

Therefore, AI configuration process based on configuration signaling transmission is proposed, in which a configuration request is sent from the application side to the AI platform before execution of at least one AI intelligentialization process with the same application configuration, so that the configuration required by the at least one AI intelligentialization process can be set/assigned in advance before execution of the at least one AI intelligentialization process, and the configuration can be fixedly used in each AI intelligentialization process, eliminating redundant operations which are needed to be performed for each AI intelligentialization process in the prior art, such as redundant model checking and loading, overcoming shortcomings about computational overhead, resource allocation and link awareness issues in the existing AI platform intelligentialization process, thereby improving the efficiency of AI intelligentialization process.

It should be noted that the foregoing describes the application configuration process according to the present disclosure in conjunction with a signaling interaction process. But this is only exemplary, and the embodiment according to the present disclosure may also be implemented in conjunction with uni-directional signaling transmission.

As mentioned hereinbefore, the AI platform feedbacks the configuration results to the application side via a response, but this is not necessary. According to one embodiment, the AI platform may not make any response regarding the configuration status. When the configuration request from the application side is satisfied, the AI platform binds the requested application configuration, such as model and resources, and temporarily stores the information of the satisfied configuration request until the resources are released. The application sends a configuration request in each subsequent application operation, and upon receipt of the configuration request, the AI platform can verify whether the configuration information in the configuration request is consistent with the configuration information in the previously temporarily stored configuration request. If they are consistent, the application configuration that has been bound, such as model and resources, is directly used for processing and the operations related to load checking and loading also can be omitted. This can also save work costs and improve efficiency to a certain extent. If they are not consistent, the AI platform can release resources and then perform configuration assignment based on the new application configuration information.

As mentioned hereinbefore, the resource release signaling interaction is initiated by the application, but this is not necessary. According to an embodiment, the AI platform may actively resource release if no application operation request is received from the application side within a specific time interval (which may be referred to as a first time interval), and then notify the application side of a release result. According to another embodiment, if no application operation request is received from the application side within the specific time interval, the AI platform may send an inquiry message to the application side to ask what kind of operation to perform subsequently, such as continue performing similar application operations, perform new operations, or release resources to wait for subsequent requests, and upon receipt of feedback from the application side, perform corresponding operations according to the received feedback message from the application side subsequently. Further, if a feedback message is not received within a second specific time interval since the inquiry message is sent, the resources can be actively released, and the release result is notified to the application side. The first and second time intervals can be set in a various ways and can be equal to or different from each other. This can contribute to efficient usage of resources to some extent. For example, if information cannot be received due to a communication failure, resources can be temporarily released for use by other application processes, instead of being vacant for a long time. It should be noted that the above operations can be performed by the processing circuitry of the electronic device on the AI platform side.

Dynamic Resource Allocation

In the prior art, once resources are initially set artificially, it will substantially remain fixed unless it is artificially changed. In this way, if a resource request from the application side cannot be satisfied, the application can only wait until available resources in the resource pool exactly meet the requirement in the resource request from the application side, which will cause resource vacancy and wasting. According to the present disclosure, a dynamic resource allocation mechanism is proposed, which can realize dynamic allocation of resources by means of configuration signaling transmission between the application side and the AI platform, and is specifically effective in a case that the resources indicated by the configuration information sent by the application side are not available.

According to one embodiment, dynamic allocation of resources can be achieved through configuration signaling interaction between the application side and the AI platform. In particular, in a case where resources indicated by the configuration information in the configuration request sent by the application side is unavailable, the AI platform can feedback information indicating currently available resources in the resource pool to the application side, so that the application side can dynamically adjust its resource configuration. In particular, the application side can decide whether to continue to wait for resources in the resource pool until the configuration request can be satisfied, or adjust its resource configuration, such as resource type, resource quantity, resource serial number, etc., to try to utilize the available resources in the resource pool according to the feedback information. This enables dynamic resource allocation. As an example, the feedback information may be included in the resource activation response and sent to the application side. In this way, the dynamic allocation of AI resources can be realized to a certain extent, and utilization efficiency of resources is improved.

According to another embodiment, dynamic resource allocation can also be implemented in a case of uni-directional configuration signaling transmission between the application side and the AI platform. In particular, the AI platform can implement dynamic resource allocation based on specific information related to resource configuration adjustment contained in the resource allocation request from the application side.

According to an embodiment, the specific information related to the resource configuration adjustment may include resource adjustment strategy information, and the processing circuitry is configured to, in a case where the resource configuration indicated in the resource allocation request is unavailable, perform adjusted resource allocation according to the resource adjustment strategy information in the resource configuration information. Here, the resource configuration determined to be unavailable may be referred to as a primary resource configuration, which may refer to an initially set resource configuration, or a resource configuration set by an application side to achieve optimal performance, or other configurations.

According to an embodiment, the resource adjustment strategy information may indicate at least one strategy/method for adjusting resources, such as strategy/method name, ID, etc. represented by any one of character, code, numerical values, etc. that can be distinguished from each other. As an example, a strategy/method may have a corresponding candidate resource configuration, and the candidate resource configuration may be expressed in the same manner as the aforementioned resource configuration, for example, candidate resource type, candidate resource quantity, candidate resource serial number required for execution of AI intelligentialization, and in this case, additionally or alternatively, the resource adjustment strategy information may also directly indicate the candidate resource configuration. As still another example, the resource adjustment strategy information may also be set to a default value corresponding to no dynamic resource adjustment or not be set, to indicate that no resource adjustment is performed. Therefore, the AI platform can perform corresponding operations related to resource adjustment according to the setting of the resource adjustment strategy information.

According to an implementation, the resource adjustment strategy information may be set to indicate one resource adjustment strategy/method, so that when it is confirmed that the primary resource configuration requirement can not be met, the AI platform continues to judge whether the candidate resource configuration corresponding to the resource adjustment strategy/method can be satisfied or not, for example, whether the resource type, the resource quantity, the resource serial number indicated in the candidate resource configuration are available. If the candidate resource configuration is determined to be satisfied, the resources indicated in the candidate resource configuration are allocated for the AI intelligentialization process and the allocation result is notified to the application side. If not available, the application side can be notified that the candidate configuration is not available, or the currently available resources in the resource pool so that the application side can determine whether to wait or adjust, as described above. In particular, as an example, a strategy/method can correspond to directly use all available resources in the current resource pool, which also belongs to a special candidate resource configuration, and for this strategy/method, the AI platform can directly allocate all available resources in the resource pool, if any, and then notify the application side of the successful allocation result.

According to another implementation, the resource adjustment strategy information may be set to indicate more than one resource adjustment strategies/methods, and correspondingly, in this case, the resource allocation request may impliedly include the primary resource allocation and more than one candidate resource configurations corresponding to the set resource adjustment strategies/methods. When it is confirmed that the primary configuration resource requirement is not met, the AI platform continues to determine whether any of the more than one candidate resource configurations can be satisfied. The AI platform can perform judgments in a variety of ways. As an example, the more than one resource adjustment strategies/methods can be sorted according to the performance of the AI intelligentialization process caused thereby in an order from high to low, and the AI platform can make judgment sequentially in this order, for example, the higher the performance caused is, the earlier the corresponding candidate resource configuration is judged. As another example, the resource adjustment strategies/methods can be sorted in descending order of the required quantity of resources (for example, the total quantity of resources, the quantity of a specific type of resources, etc.), and the AI platform can make judgment in this order. If a candidate resource configuration is determined to be available, the resources indicated in the candidate resource configuration are allocated to the AI intelligentialization process and the allocation result is notified to the application side. If all candidate resource configuration are not available, the application side can be notified that no candidate configuration is available, or can be notified of the currently available resources in the resource pool so that the application are judge whether to wait or further adjust, as described above. In this way, the resource utilization efficiency can be further appropriately improved, and an effective trade-off between execution performance and resource utilization efficiency can be achieved.

According to an embodiment, the specific information related to the resource configuration adjustment may further include resource adjustment enable information, and the resource adjustment enable information may be set a specific value to indicate whether to enable resource adjustment. As an example, the resource adjustment enable information may be represented by a binary value, where 1 indicates true, that is, resource adjustment is enabled, and 0 indicates false, that is, resource adjustment is disabled, and vice versa. In addition, the resource adjustment enable information can also be expressed in other ways, such as decimal values or values in other scale, different characters, and so on, as long as enabled and disabled resource adjustments can be distinguished from each other. Therefore, in such a case, the resource adjustment is performed only when the resource adjustment enable information is set to enable the resource adjustment. And in one implementation, the resource adjustment strategy information can be set only when the resource adjustment enable information is set enable.

According to another embodiment, the resource allocation request may include a priority parameter indicating priority of the AI intelligentialization process or the application with respect to which the requested is issued, and the AI platform may further determine the resource allocation or even adjust the resource allocation according to the priority parameter. To a certain extent, the priority parameter may also belong to specific information related to adjustment of resource allocation. In particular, in a case where there is more than one AI intelligentialization process with different resource configuration requirements, the AI platform can perform resource allocation sequentially in descending order of priority. For example, the AI platform firstly perform resource allocation for an application with highest priority, that is, firstly determine whether the resource requirement of the application can be met. The low-priority application is considered after the high-priority application when the resource requirement of the high-priority application cannot be met.

According to one embodiment, when at least two application resource activation requests are received at the same time, the AI platform may perform resource allocation for applications in descending order of priority, so that the utilization efficiency of resources may be appropriately improved and application performance can be improved to some extent. As an example, resource allocation for the high-priority application is performed firstly and then resource allocation for the low-priority application is performed after the high-priority application is not satisfied. It should be noted that satisfying the high-priority application may mean satisfying the primary resource requirement of the high-priority application, or may mean satisfying the resource requirement after resource adjustment as described above. As another example, the resource requirement of the low-priority application will not be considered unless the resource requirement of the high-priority application cannot be met.

According to another embodiment, when a configuration request for another set of one or more application operations (AI intelligentialization process) is received while the current set of one or more application operations (AI intelligentialization process) is being performed, it may be determined whether the priority indicated in the configuration request for the another set of application operations is higher than that of the current set, and if so, resources are preferentially allocated for the another set of application operations. For example, even if the current set of application operations are not finished, their corresponding resources are temporarily released and resource allocation is performed for the another set of application operations with higher priority. And after the another set of application operations with higher priority are finished, resource allocation is performed according to the configuration used for the current set of application operations to continue remaining application operations. As another example, when the resources are temporarily released, the application side may be notified of temporary release information. According to another embodiment, when configuration requests for more than one other sets of one or more application operations (AI intelligentialization processes) are received while the current set of application operations (AI intelligentialization processes) is being executed, an application operation queue may be established, wherein the configuration requests can be sorted in chronological order; or sorted according to priority, and individual configuration requests and corresponding subsequent application operations can be performed in the sorting order after the current set of application operations are finished.

Figure 7:
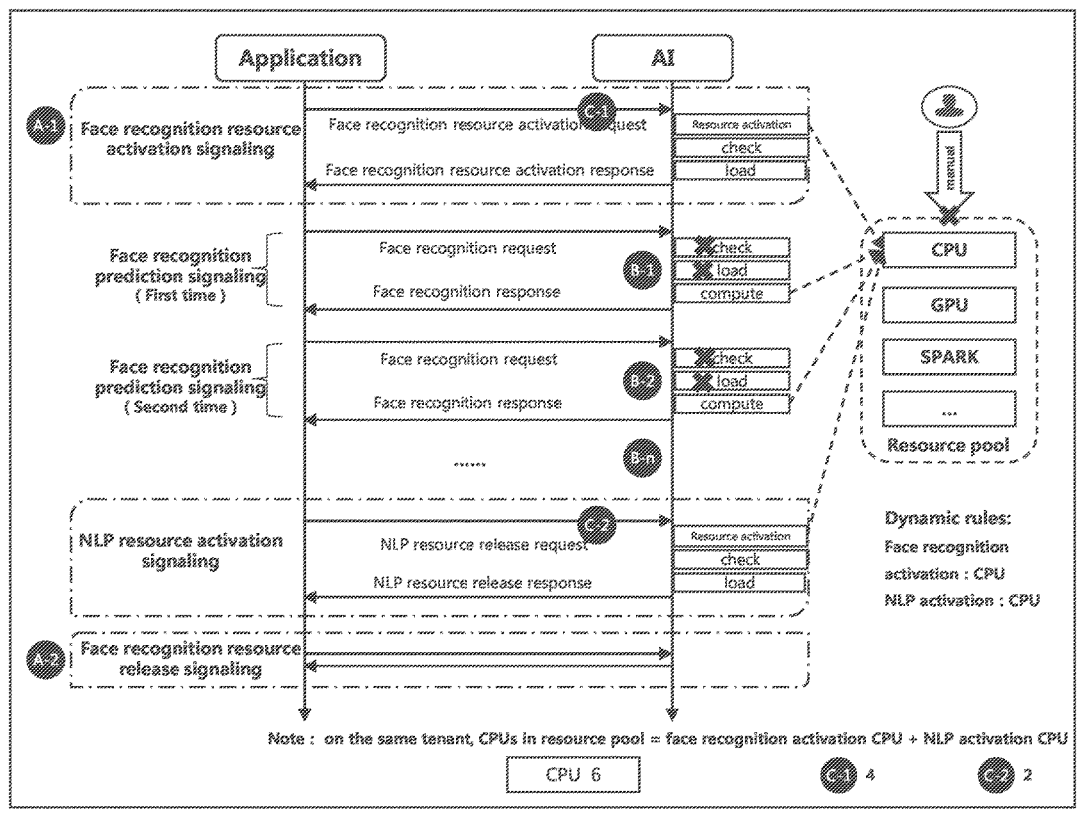
FIG. 7 illustrates a process in which different model prediction scenarios jointly request resources according to an embodiment of the present disclosure.

An example of dynamic allocation of AI resources according to an embodiment of the present disclosure will be described below with reference to FIG. 7, which, taking model prediction as an example, illustrates the dynamic configuration when different application scenarios request the same resource tool, in which face recognition and NLP (Natural Language Processing) simultaneously request CPU resources in the resource pool (the CPU quantity is set to 6). Here, the resource activation request may correspond to the aforementioned application configuration request, and the specific information related to the resource configuration adjustment is set as a minimum configuration strategy, and in an example the minimum configuration strategy may correspond to minimum resource requirement required for execution of the AI intelligentialization process and is included in the AI resource configuration information in the resource activation request. In another example, the minimum configuration strategy may mean an allocation strategy that all the remaining resources can be used regardless of its amount. Therefore, when resources need to be shared, dynamic allocation can be performed according to the AI resource configuration information of the activation request information, thereby achieving dynamic resource allocation.

In operation, first, a resource allocation request is initiated for a face recognition application scenario by means of configuration signaling transmission between the application side and the AI platform. The application side sends a resource activation request to the AI platform, as shown in "C-1" in the figure, where CPU resources are requested, the amount is 4, and the minimum configuration strategy is adopted. The AI platform receives the request and gives a successful response, indicating that 4 CPUs have been allocated for face recognition. At this time, there are two CPUs remaining in the resource pool. ☐Then, the application sides sends a resource allocation request for the NLP application scenario to the AI platform, as shown in "C-2" in the figure, where CPU resources are requested, the number is 4, the minimum configuration strategy is adopted, the AI platform receives the request, and then perform resource allocation. Specifically, although the amount of CPU resources in the resource pool is less than 4 at this time, according to the minimum configuration strategy, a successful response is still feedback when 2 CPUs can meet a minimum resource requirement, indicating that 2 CPUs have been allocated; thus far, the CPU resources in the pool are dynamically configured.

The above is only exemplary. For example, if specific information related to resource configuration adjustment is not set, or the minimum resource requirement still cannot be met, the AI platform can inform the application side of the current status of the resource pool. For example, in the above example, the application side can be notified of a status that there is only two CPUs available remaining in the current resource pool, so that the application side can determine whether to adopt the minimum configuration strategy or an allocation strategy that all the remaining resources can be used regardless of its amount, or wait for 4 CPUs to be available.

It should be noted that the order of performing face recognition first and then performing NLP here is exemplary, and other ways are also feasible. In particular, the order of executing multiple AI intelligentialization processes can depend on their types, their causality, their priorities, and so on of the AI intelligentialization processes.

Compared with the traditional intelligentialization process, it can be clearly seen that CPU/GPU resources in the prior-art process are pre-configured by human operators based on experience, belonging to a "static" rule. On the contrary, the signaling interaction of this application is a "dynamic" rule, resources can be dynamically allocated by the system according to requirements, thereby achieving efficient use of system resources and contributing to smooth execution of system operations.

Status Monitoring

Status monitoring is a measure used to assess whether the application system is stable. The level of details of a status monitoring information not only affects failure location, but also affects subsequent action decisions of the application side or a third-party of the system. In addition, the expression manner of the status monitoring information also affects the efficiency of the system monitoring and processing status. According to an embodiment of the present disclosure, improved status monitoring information is proposed, and a measurement framework for status monitoring is designed to improve automation in a status diagnosis process, thereby reducing the cost of manual intervention and improving the efficiency of the intelligentialization process. According to an embodiment of the present disclosure, the status monitoring information may specifically include coded information related to AI intelligentialization status when an abnormity occurs. The AI intelligentialization status may include at least one of a type of the abnormity, an application scenario in which the abnormity occurs, an operation stage in which the abnormity occurs, and so on. According to another embodiment, the status monitoring information may further include information indicating subsequent operations to be executed accordingly. Therefore, when an abnormity occurs, the failure can be quickly located and accurately eliminated, and the resource allocation process can be more efficient.

The implementation of status monitoring according to the present disclosure will be exemplarily described below. The disclosure designs a set of Binary State Metrics Framework (BSMF), which uses "binary bits" to measure different monitoring objects, reduces the byte length of a single communication, and improves network transmission efficiency. State monitoring fields are introduced to compensate lack of indication marks in the traditional status mechanism, reduce the cost of manual intervention to a certain extent, and further improves automatic processing performance. Of course, it should be noted that this binary code is only exemplary, and various monitoring fields can also be provided in other ways, such as decimal codes, symbols, strings, and so on. That is, the present disclosure formats various monitoring fields so that different codes can be used to distinguish different monitoring states, so that different monitoring states can be automatically identified by means of a machine.

According to an embodiment, status monitoring information can at least include type information, service information, milestone information, control information and status information. The type information can indicate the status category of the application, the service information can indicate the application scenario, the milestone information can indicate a logic flow included in the application, the control information can indicate operation to be applied with respect to the abnormity, and the status information abnormity state.

As an example, the present disclosure at least splits a 32-bit unsigned integer status monitoring information into: a type code, a reservation code, a service code, a milestone, a control code, and a status code. The following table illustrates an exemplary status metric framework.

TABLE 1 status metric framework

| bits (binary) | 31 30 29 28 | 27 26 25 | 24 23 22 21 20 19 | 18 17 16 15 14 | 13 12 11 10 | 9 8 7 6 5 4 3 2 1 0 |
|---|---|---|---|---|---|---|
| description | Type (4 bit) | reserved (3 bit) | service (6 bit) | milestone (5 bit) | control (4 bit) | status (10 bit) |
| definition | User authentication 0001 | System extensions 000 | Classification / clustering / Time series prediction / Feature engineering / Anomaly detection / Image recognition / OCR / NLP / ASR / ... | ETL 00001 / Pre-processing / training / deployment / ... | undefinition / checking 0001 / Retransmission / waiting / ... | General abnormity code User not exist (0000000001), Password error, ... / Pre-processing abnormity code / training abnormity code / ... |
| | ← Scenario identification | | | Process identification → | | |

As shown in the table, the basic description of the state measurement framework is:

Type code: 4 bits, maximum of 16, for defining the status type. Such as: authentication type, parameter type, resource type, etc. In a resource control stage, this type is fixed as a resource type;

Reserved code: 3 bits, maximum of 8, for system extension. Default: 000;

Service code: 6 bits, maximum of 64, for defining the application scenario framework. Such as: classification, clustering, image analysis, etc.;

Milestone: 5 bits, maximum of 32, for defining logic flow. Such as: data extraction, preprocessing, training, etc.;

Control code: 4 bits, maximum of 16, for defining status indicator. Such as: check, retransmission, waiting, etc.;

Status code: 10 bits, maximum of 1024, for defining abnormity states. Such as: password error, resources are busy, etc.;

The type code, service code, and milestone mentioned above may be examples of the above-mentioned information about the AI intelligentization status, which is intended to clearly and intuitively indicate the type of abnormity, scenario, process stage, etc. in which the abnormity occurs, and the control code may indicate subsequent operations to be executed. It should be noted that the information related to the AI intelligentization status can also be expressed in other ways, as long as it can contribute to quick and accurate location of abnormity and additionally clearly indicate operations to be executed when the abnormity occurs. An example of resource type status monitoring feedback information will be described below.

TABLE 2

| | resource type status monitoring feedback information | | | | | | | |
|---|---|---|---|---|---|---|---|---|
| | Binary | | | | | | | |
| Bit description | 31 30 29 28 type (4 bit) | 27 26 25 Reserved (3 bit) | 24 23 22 21 20 Service (6 bit) | 19 18 17 16 15 Milestone (5 bit) | 14 13 12 11 Control (4 bit) | 10 9 8 7 6 5 4 3 2 1 0 Status (10 bit) | Decimal | Description |
| definition | system resource type: 0011 | reserved for system extension default: 000 | classification analysis: 000000 clustering analysis: 000001 time series prediction: 000011 feature engineering: 000100 image recognition: 000101 ... | training: 00011 prediction: 00100 ... | undefinition: 0000 checking: 0001 ignore: 0010 reset: 0011 retransmission: 0100 waiting: 0101 ... | Token invalid: 0000000011 ... resource busy: 0000000100 resource overflow: 0000000110 parametertype error: 0000001000 parameter invalid: 0000001001 ... | | type-scenario-processing-abnormity description |
| Examples | | | 00110000000101000110000001000 | | | | 807977992 | system resource type, image recognition scenario, in the processing of model training, report abnormity of parameter type error, and instruct client to check |
| | | | 00110000000100011000000001001 | | | | 805880841 | system resource type, classification analysis scenario, in the processing of model training, report abnormity of parameter invalid, and instruct client to check |
| | | | 00110000000101000101000000100 | | | | 807998468 | system resource type, image recognition scenario, in the processing of model prediction, report abnormity of resource busy, and instruct client to wait |

TABLE 2-continued resource type status monitoring feedback information

| Binary | | | | | | | | | | | Description |
|---|---|---|---|---|---|---|---|---|---|---|---|
| 31 30 29 28 type (4 bit) | 27 26 25 Reserved (3 bit) | 24 23 | 22 21 20 Service (6 bit) | 19 18 17 | 16 15 14 13 Milestone (5 bit) | 12 11 10 9 Control (4 bit) | 8 7 6 5 4 3 2 1 0 Status (10 bit) | | | Decimal | type-scenario-processing-abnormity description |
| 0011000000101000001000000110 | | | | | | | | | | 807994374 | system resource type, image recognition scenario, in the processing of model prediction, report abnormity of system resource overflow |
| . . . | | | | | | | | | | . . . | . . . |

Among them, the "definition" row in the table illustrates the possible values of each field and corresponding meaning, and the "example" row gives binary encoding examples of the resource type status monitoring feedback information obtained by combining values of the fields. The "Decimal" column gives the decimal value corresponding to the binary code of each example, and the "Description" column gives the abnormity status information indicated by each binary code example.

In one example, when an abnormity occurs, the type field (4 bit) is set to 0011, which indicates that it is a resource type; the reserved code field (3 bit) is set to 000; the service field (6 bit) is set to 000101, which indicates that the application scenario is image recognition; the milestone field (5 bit) is set to 00011, which indicates that the logical process is a training process; the control field (4 bit) is set to 0001, which instructs the application side to check; the status field (10 bits) is set to 0000001000, which indicates that the abnormity is a parameter type abnormality. For this example, a binary code 00110000001010001100010000001000 is automatically generated by the system, especially the AI platform side, and the corresponding decimal number is: 807977992. This code describes an abnormity which is of the system resource type, in the image recognition scenario, during the training stage and of a parameter type, and instructs the application type to perform a check operation. It can be seen from the above that by identifying the coded information indicating the abnormity, it is possible to quickly and accurately determine the type of the abnormity, the scenario, the operating stage, and so on, and it can also perform the corresponding subsequent operation according to the information, thereby quick location and accurate elimination of failures can be achieved, and the AI resource allocation process and the AI intelligentization process become more efficient.

According to the embodiment of the present disclosure, the status monitoring information is provided by the AI platform side to the application side or a third party, for diagnosing the application system status. The third party may refer to a device capable of detecting/diagnosing an application system status, for example. According to an embodiment of the present disclosure, the processing of response information sent to the application side by the AI platform can be further optimized by adding status monitoring information to the response information. The status monitoring information can be included in various response information sent by the AI platform to the application side, such as resource activation response information, prediction identification response information, and resource release response information.

Figure 8:
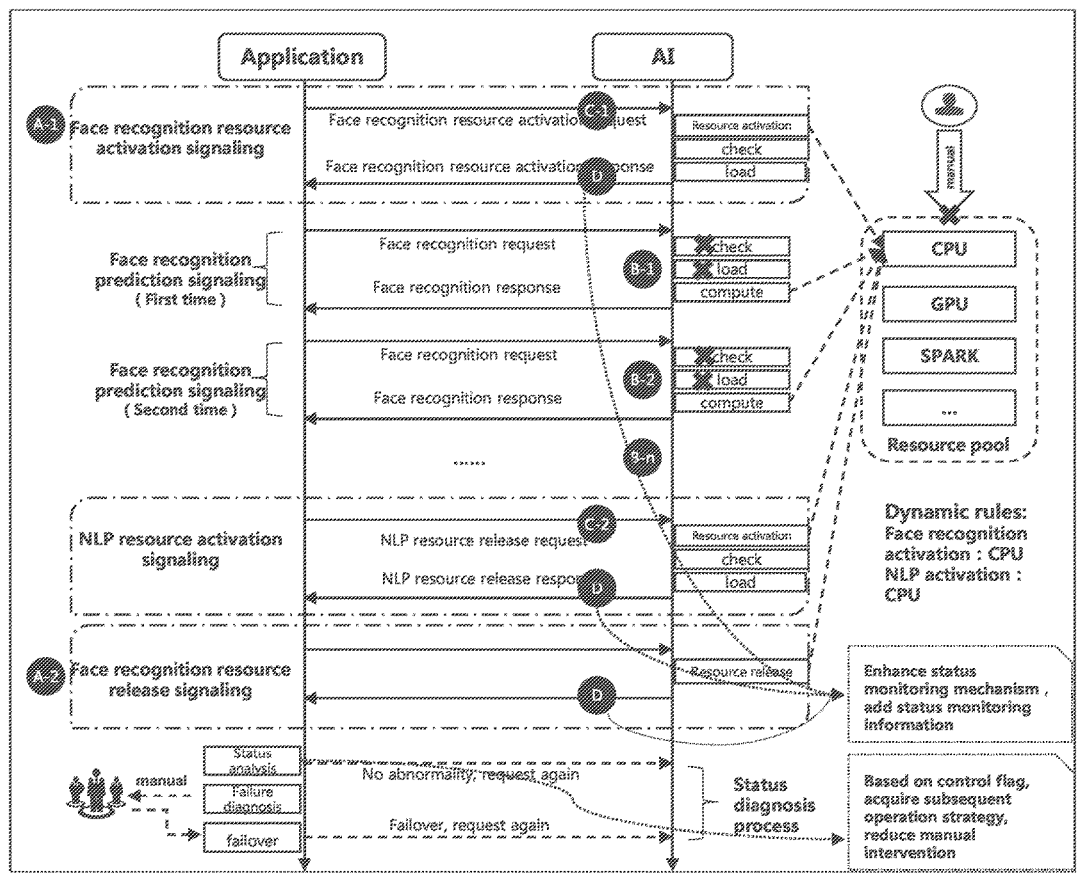
FIG. 8 illustrates a schematic diagram in which status monitoring information is added to enhance link awareness according to an embodiment of the present disclosure.

An example of applying the status monitoring information in resource configuration signaling interaction according to the present disclosure will be described below with reference to FIG. 8. In the operation process, the application side initiates a resource activation request or a resource release request, and the AI platform responds to the request, the respondence includes at least the status monitoring information and feedback of the resource status execution effect. As indicated by "D" in the figure; then, the application receives the response and analyzes the result and status, and requests again if there is no abnormity. And If there is an abnormity, the system will automatically perform a failure identification based on status monitoring information, obtain a subsequent operation strategy, and recover from the failure and initiate an operation request again, thereby reducing the frequency of manual intervention.

It should be noted that the status monitoring information can also be included in other response information that the AI platform feeds back to the application side. According to another embodiment, feedbacking of the state monitoring information may be triggered by the AI platform side in response to a change in the status of the application system. As an example, once a status change occurs, the state monitoring information indicating the status change can be sent by the AI platform side to the application side or a third party.

It can be seen from the above that by designing a status monitoring measurement framework to construct state monitoring information, the application side can quickly locate and eliminate anomalies based on the state monitoring information, making the resource allocation process more efficient.

In a structural example of the electronic device, the processing circuitry 420 may be in the form of a general-purpose processor, or may be a special-purpose processor, such as an ASIC. For example, the processing circuitry 420 can be configured by a circuit (hardware) or a central processing device such as a central processing unit (CPU). In addition, the processing circuitry 420 may carry a program (software) for operating a circuit (hardware) or a central processing device. The program can be stored in a memory (such as resided in the memory) or an external storage medium connected from the outside, or downloaded via a network (such as the Internet).

According to an embodiment of the present disclosure, the processing circuitry 420 may include various units for implementing the above functions, such as the receiving unit 422 for receiving a configuration request from an application-side electronic device for the at least one AI intelligentialization process, the configuration request including information indicating application configuration; and an assignment unit 424, for, when the application configuration is available, assigning the application configuration for use by the at least one AI intelligentialization process during execution. Preferably, the processing circuitry 420 may further include a feedback unit 426 for, when the requested application configuration is satisfied, feedbacking to the application-side electronic device information indicating that the requested application configuration is satisfied, so that the application-side electronic device can request the AI-side electronic device to perform the at least one AI intelligentialization process without further issuing a configuration request.

Preferably, the receiving unit 422 may also receive a request from an application-side electronic device for executing the at least one AI intelligentialization process, and execute the at least one AI intelligentialization process by directly utilizing the application configuration assigned to the at least one AI intelligentialization process. Preferably, the receiving unit 422 may further receive a resource release request from an application-side electronic device.

Preferably, the assignment unit 424 may also perform resource allocation for the at least one AI intelligentialization process according to specific information in the configuration request related to resource configuration adjustment. Preferably, the assignment unit 424 can also, when the resource configuration indicated in the configuration request cannot be satisfied, allocate resources for the at least one AI intelligentialization process according to candidate resource configuration corresponding to the resource adjustment strategy information. Preferably, the assignment unit 424 may also perform resource allocation for AI intelligentialization processes according to priority information. Preferably, the assignment unit 424 may release resources allocated for the at least one AI intelligentialization process.

Preferably, the feedback unit 426 may also provide information on currently available resources in the resource pool to the application-side electronic device when the resource configuration included in the requested application configuration cannot be satisfied, so that the application-side electronic device can adjust the resource configuration. Preferably, the feedback unit 426 may further provide status monitoring information in response information provided from the electronic device on the AI platform side, and the status monitoring information includes coded information related to AI intelligentialization status when an abnormality occurs. The AI intelligentialization status may include at least one of a type of the abnormality, an application scenario in which the abnormality occurs, and an operation phase in which the abnormality occurs, etc. Preferably, the feedback unit 426 can notify the application-side electronic device of the release result via the response information. The operation of each unit can be performed as described above, which will not be described in detail here. The unit is drawn with a dashed line in the figure to illustrate that the unit is not necessarily included in the processing circuitry. As an example, the units can be in the AI platform-side electronic device and outside of the processing circuitry, or even be located outside of the AI platform-side electronic device 400. It should be noted that although each unit is shown as a separate unit in FIG. 4A, one or more of these units may be combined into one unit or split into multiple sub-units.

It should be noted that each of the above units is only a logical module divided according to a specific function implemented by it, instead of being used to limit a specific implementation manner, and for example, it may be implemented in software, hardware, or a combination of software and hardware. In an actual implementation, the foregoing units may be implemented as independent physical entities, or may be implemented by a single entity (for example, a processor (CPU or DSP, etc.), an integrated circuit, etc.). In addition, the above-mentioned respective units are shown with dashed lines in the drawings to indicate that these units may not actually exist, and the operations/functions they implement may be realized by the processing circuitry itself.

It should be understood that FIG. 4A is merely a schematic structural configuration of the AI platform-side electronic device, and the AI platform-side electronic device 400 may further include other possible components (for example, a memory, etc.). Optionally, the AI platform-side electronic device 400 may further include other components not shown, such as a memory, a radio frequency stage, a baseband processing unit, a network interface, a controller, and the like. The processing circuitry may be associated with a memory and/or an antenna. For example, the processing circuitry may be directly or indirectly (eg, other components may be connected in between) connected to the memory for data access. Also for example, the processing circuitry may be directly or indirectly connected to the antenna to transmit signals via the communication unit and receive radio signals via the communication unit.

The memory may store various kinds of information (for example, data traffic related information, resource configuration information, etc.) generated by the processing circuitry 420, programs and data for operation by the application-side electronic device, data to be transmitted by the application-side electronic device, and the like. The memory may also be located inside the AI platform-side electronic device but outside of the processing circuitry, or even outside of the application-side electronic device. The memory may be a volatile memory and/or a non-volatile memory. For example, the memory may include, but is not limited to, random access memory (RAM), dynamic random access memory (DRAM), static random access memory (SRAM), read-only memory (ROM), and flash memory.

Figure 4B:
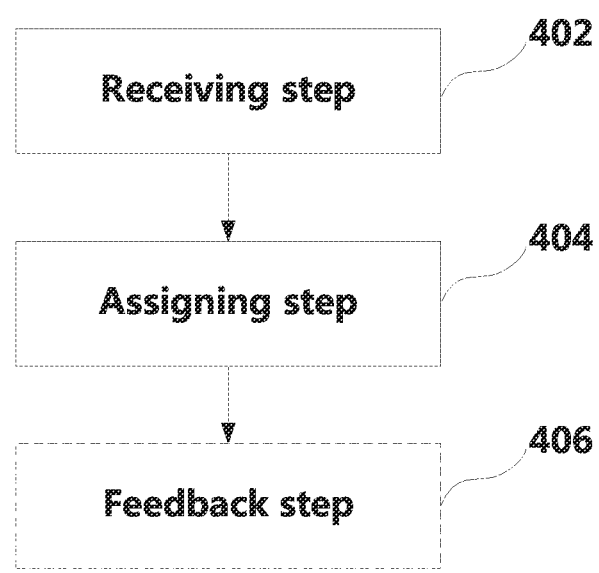
FIG. 4B illustrates a flowchart of a method on an AI platform side according to an embodiment of the present disclosure.

FIG. 4B illustrates a flowchart of an AI platform-side method according to an exemplary embodiment of the present disclosure. The method includes receiving step 402 for receiving a configuration request from an application-side electronic device for the at least one AI intelligentialization process, the configuration request including information indicating application configuration; and assignment step 404, for, when the application configuration is available, assigning the application configuration for use by the at least one AI intelligentialization process during execution. Preferably, the method may further include a feedback step 406 for, when the requested application configuration is satisfied, feedbacking to the application-side electronic device information indicating that the requested application configuration is satisfied, so that the application-side electronic device can request the AI-side electronic device to perform the at least one AI intelligentialization process without further issuing a configuration request. It should be noted that the feedback step is drawn with a dashed line to illustrate that the feedback step does not have to be included in the method.

It should be noted that the method according to the present disclosure may further include operation steps corresponding to operations performed by the processing circuitry of the above-mentioned electronic device on the AI platform side, which will not be described in detail here. It should be noted that each operation of the method according to the present disclosure may be performed by the aforementioned AI platform-side electronic device, in particular by a processing circuitry or a corresponding processing unit of the AI platform-side electronic device, which will not be described in detail here.

Figure 9A:
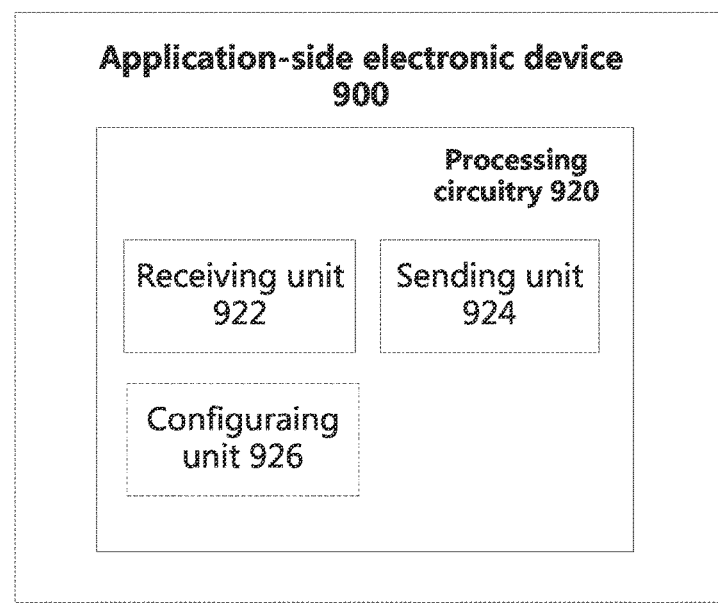
FIG. 9A schematically illustrates a block diagram of an application-side electronic device according to an embodiment of the present disclosure, and FIG. 9B schematically illustrates a block diagram of an application-side method according to an embodiment of the present disclosure.

An application side according to an exemplary embodiment of the present disclosure will be described below with reference to FIGS. 9A and 9B, where FIG. 9A illustrates a block diagram of an application-side electronic device according to an exemplary embodiment of the present disclosure. The application-side electronic device 900 may include a processing circuitry 920, and the processing circuitry 920 may be configured to send an electronic device on an AI platform side a configuration request for the at least one AI intelligentialization process, the configuration request including information indicating the application configuration, receive response information from the electronic device on the AI platform side indicating that the application configuration is satisfied, and send an operation request to the electronic device on the AI platform side to perform the at least one AI intelligentialization process without any further configuration request.

Preferably, the processing circuitry 920 may be further configured to receive information indicating that the resource configuration included in the application configuration cannot be satisfied from the electronic device on the AI platform side and information indicating currently available resources in the resource pool, perform resource configuration adjustment, and send the adjusted resource configuration to the electronic device on the AI platform side via a configuration request.

Preferably, the processing circuitry 920 may be further configured to receive status monitoring information from the electronic device on the AI platform side, where the status monitoring information includes coded information related to an AI intelligentialization status when an abnormity occurs. The AI intelligentialization status may include at least one of a type of the abnormity, an application scenario in which the abnormity occurs, an operation stage in which the abnormity occurs, etc., and analyze the status monitoring information to identify and recover from the abnormity.

Preferably, the processing circuitry 920 may be further configured to send a resource release request to the electronic device on the AI platform side, and receive a release result from the electronic device on the AI platform side.

It should be noted that the meanings of the various requests, information, etc. in processes/operations implemented by the processing circuitry 920 may be the same as that described above, and will not be described in detail here. In addition, the electronic device 900 and the processing circuitry 920 may be implemented in a similar implementation manner to the aforementioned electronic device 400 and the processing circuitry 420, such as a processor, a unit, a program module, and the like. As an example, the processing circuitry 920 may include a receiving unit 922, a sending unit 924, and a configurating unit 926. These units may respectively implement the aforementioned functions of receiving operations, sending operations, resource configuration/adjustment operations, and the like, which will not be described in detail here. Moreover, similar to the processing circuitry 420, the processing circuitry 920 may also include the aforementioned additional components. It will not be described in detail here.

Figure 9B:
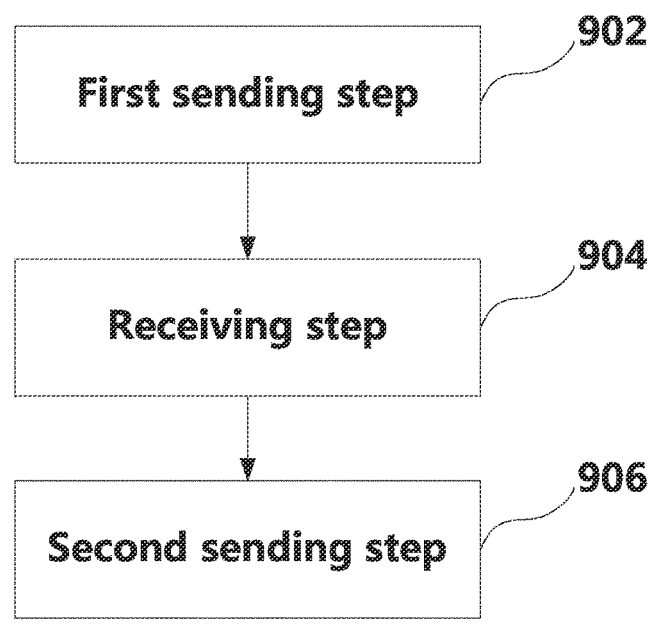

FIG. 9B illustrates a flowchart of an application-side method according to an exemplary embodiment of the present disclosure. The method includes a first sending step 904 for sending an electronic device on an AI platform side a configuration request for the at least one AI intelligentialization process, the configuration request including information indicating the application configuration, a receiving step 906 for receiving response information from the electronic device on the AI platform side indicating that the application configuration is satisfied, and a second sending step 908 for sending an operation request to the electronic device on the AI platform side to perform the at least one AI intelligentialization process without any further configuration request.

It should be noted that the method according to the present disclosure may further include operation steps corresponding to operations performed by the processing circuitry of the application-side electronic device, which will not be described in detail here. It should be noted that each operation of the method according to the present disclosure may be performed by the above-mentioned application-side electronic device, especially by a processing circuitry or a corresponding processing unit of the application-side electronic device, which will not be described in detail here.

The following will exemplarily describe an exemplary design of a configuration request that may be used in a configuration signaling interaction according to the present disclosure.

An example of the information indicating the resource configuration included in the configuration request may be AI resource configuration information, which includes, for example, resource type, resource quantity, resource serial number. In addition, the resource configuration information may also include resource allocation strategy information. Exemplary AI resource configuration information is as follows:

TABLE 3

Examplary parameters of AI resource configuration information

| Name | Require or not | Type | Description |
| --- | --- | --- | --- |
| resourceType | Yes | String | Resource type, maximum of 32 bytes, such as CPU, GPU, FPGA, SPARK . . . |
| resourceList | Yes | String | resource list, maximum of 128 bytes, for example, GPU serial number or SPARK queue name |
| resourceRatio | Yes | Short | Resource ratio, between 0 and 1, defalut value 1, that is, all resources |
| resourceStrategy | Yes | String | resource allocation strategy, maximum of 128 bytes, such as fair allocation, minimum allocation |
| . . . | . . . | . . . | . . . |

As shown above, the AI resource configuration information includes at least resource types, lists, ratios, and allocation strategies (such as fair allocation strategy and minimum allocation strategy). Although not shown, the AI resource configuration information may also include candidate resource configurations, and each candidate resource configuration may also include resourceType and resourceList, as described above. It should be noted that the resource ratio may represent the ratio of the requested resource to all resources listed in the resource list. As an example, if the resource ratio is less than 1, the resource ratio may be considered as corresponding to a kind of candidate resource configuration. For example, if the resources listed in resourceType and resourceList cannot be available, then it can be determined whether resources corresponding to the resource ratio can be available.

The information indicating the model configuration included in the configuration request may include at least an application scenario model ID and an application scenario model name. The configuration request may further include other information indicating an application scenario, such as an application scenario name, a sub-application scenario name, and application scenario parameters. In particular, as an example, if the application scenario name/application scenario ID corresponds to resource configuration, model configuration, etc. as described above, the configuration request may include only the application scenario name/application scenario ID, and the resource configuration parameters and model configuration parameters can be directly derived from the application scenario name/application scenario ID, which can further save signaling overhead.

Therefore, corresponding configuration requests can be provided for different AI intelligentialization processes. For example, an example of a configuration request for an AI training intelligentialization process is a training activation request, which may include information about model training in the following table:

TABLE 4

Examplary parameters of model training information

| Name | Required or not | Type | Description |
| --- | --- | --- | --- |
| appFrame | Yes | String | application scenario name, maximum of 128 types, such as face recognition |

TABLE 4-continued

Examplary parameters of model training information

| Name | Required or not | Type | Description |
|---|---|---|---|
| appSubFrame | Yes | String | application scenario name, maximum of 128 types, such as feature extraction |
| appParam | Yes | String | application scenario request parameter, JSON format |
| appModelName | No | String | application scenario model name, maximum of 128 types, such as a specific model for face recognition |
| methodType | No | Short | Computation method, 1: on-line resources; 2: off-line resources |
| resourceType | Yes | String | Resource type, maximum of 32 bytes, such as CPU, GPU, FPGA, SPARK . . . |
| resourceList | Yes | String | resource list, maximum of 128 bytes, for example, GPU serial number or SPARK queue name |
| resourceRatio | Yes | Short | Resource ratio, between 0 and 1, defalut value 1, that is, all resources |
| resourceStrategy | Yes | String | resource allocation strategy, maximum of 128 bytes, such as fair allocation, minimum allocation |

The appModelName may correspond to an example of the information indicating a model configuration as mentioned above, and appFrame, appSubFrame, and appParam may correspond to an example of the information indicating an application scenario as mentioned above.

It should be noted that the model training information parameters given in the above table are only exemplary, and it is not necessary to include all the parameters. As an example, the parameters in the above table can also be expressed in other ways. For example, both the application scenario name and the sub-application scenario name may be combined into one Name parameter. As another example, the application scenario name and the application scenario model name may be combined into a parameter containing information of the two.

For example, one example of a configuration request for the AI prediction intelligentialization process may be a prediction activation request, which may include model prediction information in the following table:

TABLE 5

Examplary parameters of model prediction information

| Name | Required or not | Type | Description |
|---|---|---|---|
| appModelName | Yes | String | application scenario model name, maximum of 128 types, such as a specific model for face recognition |
| appModelID | Yes | String | Application scenario model I, maximum of 64 bytes |
| methodType | No | Short | Computation method, 1: on-line resources; 2: off-line resources |
| resourceType | Yes | String | Resource type, maximum of 32 bytes, such as CPU, GPU, FPGA, SPARK . . . |
| resourceList | Yes | String | resource list, maximum of 128 bytes, for example, GPU serial number or SPARK queue name |
| resourceRatio | Yes | Short | Resource ratio, between 0 and 1, defalut value 1, that is, all resources |
| resourceStrategy | Yes | String | resource allocation strategy, maximum of 128 bytes, such as fair allocation, minimum allocation |

The appModelName and appModelID included in the model prediction information shown in the above table may belong to examples of the information indicating the model configuration as mentioned above. Similarly, the model prediction information parameters given in the above table are only exemplary and it is not necessary to include all the parameters. As an example, the parameters of the model prediction information may be expressed in other ways. For example, the application scene model name and the application scene model ID may be combined into a parameter containing information of both.

The response information to the configuration request according to the present disclosure may include at least status monitoring information. An example of response information to the activation request is shown below.

TABLE 6 examplary parameters of activation response information

| Name | Required or not | Type | Description |
|---|---|---|---|
| processCode | Yes | UInt | Feedback information, as seen in the definition of status measurement framework |
| resourceUrl | Yes | String | Resource address, a plurality of functional addresses are allowed |
| resourceID | Yes | String | resource ID, maximum of 32 bytes |
| resourceType | Yes | String | Resource type, maximum of 32 bytes, such as CPU, GPU, FPGA, SPARK . . . |
| resourceList | Yes | String | resource list, maximum of 128 bytes, for example, GPU serial number or SPARK queue name |
| resourceRatio | Yes | Short | Resource ratio, between 0 and 1, defalut value 1, that is, all resources |
| resourceStrategy | Yes | String | resource allocation strategy, maximum of 128 bytes, such as fair allocation, minimum allocation |
| . . . | . . . | . . . | . . . |

The processCode in the above table may correspond to the status monitoring information described above, and its form may refer to the definition of the status measurement framework as described above.

The above table also illustrates AI resource configuration information. The resourceUrl and resourceID in the above table are information related to AI resource configuration, but it should be pointed out that the information is not necessary. In particular, if resources in the current resource pool cannot meet the application configuration requirement, the available resources in the resource pool can be reflected through the AI resource configuration information, so that the application side can actively decides whether resource adjustment is intended to be made or not. When the resources in the current resource pool can meet the configuration requirement, it is not necessary to include AI resource configuration information, and only information indicating that the resource configuration is satisfied can be returned, for example, by using a specific character, number, code, and the like.

The resource release signaling according to the present disclosure may include release request information and release response information. The release request information includes at least a resource ID; the release response information includes at least the status monitoring information. The resource ID and status monitoring information can be that as described above, which will not be described in detail here.

The following will exemplarily describe a signaling interaction flow for configuration of an AI intelligentialization process according to the present disclosure. Table 7 illustrates a signaling interaction flow for activation configuration for the AI model intelligentialization process, which mainly includes resource allocation.

TABLE 7 resource activation flow for model training
resource activation process (training)
Description: dynamically activate resources for an application scenairo training, return a list of addresses of available services

| 1. Interface description | | | | 4. DEMO (Request & Response) |
|---|---|---|---|---|
| interface type (API) | action | parameter type (Media Type) | requested address (no domain name) (URL) | Request: creation of online face recognition feature extraction model training, asking for GPU |
| REST | GET | JSON | /ais/resource/activeBearer/training | GET /ais/resoure/activeBearer/training HTTP/1.1 Host:apiaicom |
| 2. request parameter | | | | |
| parameter name | required or not | parameter type | parameter description | X-aid-date: 2019-07-23T13:02:00Z connection:keep-alive |
| token | Yes | String | token, maximum of 128 bytes | Content-Type:application/json |
| appFrame | Yes | String | application scenario name, maximum of 128 types, such as face recognition | User-Agent: AISignaling/1.0 (Standard) accept:version= 1.0 |
| appSubFrame | Yes | String | application scenario name, maximum of 128 types, such as feature extraction | { token"bbbaaddfkhjdhhs112232dd" |
| appParam | Yes | String | application scenario request parameter, JSON format | "appFram e":"FaceRecognition" "appSubFram e":"FeatureExtraction", |
| appModelName | No | Stri g | application scenario model name, maximum of 128 types, such as a specific model for face recognition | "appParam ":", "methodType": 1, |
| methodType | No | Short | computing method, 1: on-line resources; 2: off-line resources | "resourceType""CPU ", "resourceList"0,1,2", "resourceRatio"1 |
| resourceType | Yes | String | Resource type, maximum of 32 bytes, such as CPU, GPU, FPGA, SPARK . . . | "resourcePolicy":M n" } |
| resourceList | Yes | String | resource list, maximum of 128 bytes, for example, GPU serial number or SPARK queue name | |
| resourceRatio | Yes | Short | Resource ratio, between 0 and 1, defalut value 1, that is, all resources | |
| resourcePolicy | Yes | String | resource allocation strategy, maximum of 128 bytes, such as fair allocation, minimum allocation | |
| | | | | Response |
| 3. Resposne content | | | | { |
| parameter name | required or not | parameter type | parameter description | "processCode":O, "processInfo": "OK" , |
| processCode | Yes | String | Feedback information, as seen in the definition of status measurementframework | "resourceUrl": {"Register":/apiaicom /ais/training/ FaceRecognition/FaceRegister", |
| processinfo | No | String | feedback information descripiton, maximum of 512 bytes | "Identification":"/apiaicom /ais/training/ FaceRecognition/FaceIdentify"} |
| resourceUrl | Yes | String | Resource address, a plurality of functional addresses are allowed | "resourceID":"1234567890", "resourceType""CPU ", |
| resourceID | Yes | String | resource ID, maximum of 32 bytes | "resourceList":"1,2", |
| resourceType | Yes | String | Resource type, maximum of 32 bytes, such as CPU, GPU, FPGA, SPARK . . . | "resourceRatb":1 "resourcePolicy":M n" |
| resourceList | Yes | String | resource list, maximum of 128 bytes, for example, GPU serial number or SPARK queue name | } |
| resourceRatio | Yes | Short | Resource ratio, between 0 and 1, defalut value 1, that is, all resources | |
| resourcePolicy | Yes | String | resource allocation strategy, maximum of 128 bytes, such as fair allocation, minimum allocation | |

Table 8 illustrates a signaling interaction flow for activation configuration for the AI model intelligentialization process, which mainly includes model allocation and resource allocation.

TABLE 8 resource activation flow for model prediction
resource activation process (prediction)
Description: dynamically activate resources for an application scenairo prediction, return a list of addresses of available services

| | 1. Interface description | | | 4. DEMO (Request & Response) |
|---|---|---|---|---|
| interface type (API) | action | parameter type (MediType) | requested address (no domain name) (URL) | Request: creation of online feature extraction for face recognition model prediction, asking for GPU |
| REST | GET | JSON | /ais/resource/activeBearer/inference | GET /ais/resource/activeBearer/training HTTP/1.1 Host:apiaicom |

| | 2. request parameter | | | |
|---|---|---|---|---|
| parameter name | required or not | parameter type | parameter description | X-aid-date: 2019-07-23T13:02:00Z connection:keep-alive |
| token | Yes | String | token, maximum of 128 bytes | Content-Type:application/json |
| appFrame | Yes | Stri ng | application scenario name, maximum of 128 types, such as face recognition | User-Agent: AISignaling/1.0 (Standard) accept:version= 1.0 |
| appSubFrame | Yes | String | application scenario name, maximum of 128 types, such as feature extraction | { token"bbbaaddfkhjdhhs112232dd" |
| appModelName | Yes | String | application scenario model name, maximum of 128 types, such as face recognition model for Xin Application | "appFram e"'"FaceRecognition", "appSubFram e":FeatureExtraction", |
| appModelID | No | Stri ng | Application scenario model ID, maximum of 64 bytes | "appM odeNam e":"A I_FACE", "appM ode Id":"R-34567890" |
| methodType | No | Short | Calculation method, 1: on-line resources; 2: off-line resources | "methodType": 1, "resourceType""CPU", |
| resourceType | Yes | String | Resource type, maximum of 32 bytes, such as CPU, GPU, FPGA, SPARK . . . | "resourceList"0,1,2 ", "resourceRatio"1 |
| resourceList | Yes | String | resource list, maximum of 128 bytes, for example, GPU serial number or SPARK queue name | "resourcePolicy":M n" } |
| resourceRatio | Yes | Short | Resource ratio, between 0 and 1, defalut value 1,t hat is, all resources | |
| resourcePolicy | Yes | String | resource allocation strategy, maximum of 128 bytes, such as fair allocation, minimum allocation | |
| | | | | Response |

| | 3. Response content | | | { |
|---|---|---|---|---|
| parameter name | required or not | parameter type | parameter description | "processCode":O, "processInfo": "OK" , |
| processCode | Yes | String | Feedback information, as seen in the definition of status measurementframework | "apUrl": {"Register":/apiaicom /ais/inference/ "Identification":"/apiaicom /ais/ |
| processinfo | No | String | feedback information descripiton, maximum of 512 bytes | inference/FaceRecognition/ FaceIdentify"} |
| resourceUrl | Yes | String | Resource address, a plurality of functional addresses are allowed | "resourceID":"2234567890", "resourceType""CPU ", |
| resourceID | Yes | String | resource ID, maximum of 32 bytes | "resourceList":"1,2", |
| resourceType | Yes | String | Resource type, maximum of 32 bytes, as such CPU, GPU, FPGA, SPARK . . . | "resourceRatio":1 "resourcePolicy":M n" |
| resourceList | Yes | String | resource list, maximum of 128 bytes, for example, GPU serial number or SPARK queue name | } |
| resourceRatio | Yes | Short | Resource ratio, between 0 and 1, defalut value 1, that is, all resources | |
| resourcePolicy | Yes | String | resource allocation strategy, maximum of 128 bytes, such as fair allocation, minimum allocation | |

Table 9 illustrates a resource release signaling interaction flow when the application configuration in the configuration request is satisfied.

TABLE 9 resource release flow
resource release process
Description: dynamical release resources for an application scenairo

| 1. Interface description | | | | 4. DEMO (Request & Response) |
|---|---|---|---|---|
| interface type (API) | action | parameter type (Media type) | requested address (no domain name) (URL) | Request: creation of online face recognition feature extraction |
| REST | GET | JSON | /ais/resource/deleteBearer | model training, asking for GPU |
| 2. request parameter | | | | GET /ais/resource/deltaBearer HTTP/1.1 |
| parameter name | required or not | parameter type | parameter description | Host:apiaicom<br>X-aid-date: 2019-07-23T13:02:00Z |
| token | Yes | String | token, maximum of 128 bytes | connection:keep-alive |
| appFrame | No | String | application scenario name, maximum of 128 types, such as face recognition | Content-Type:application/json<br>User-Agent: AISgnaing/1.0 Standard) |
| appSubFrame | No | String | application scenario name, maximum of 128 types,s uch as feature extraction | accept:version= 1.0 |
| appModelName | No | String | application scenario model name, maximum of 128 types, such as face recognition model for Xin Application | {<br>  token"bbbaaddfkhjdhhs112232dd"<br>  "resourceID":"1234567890", |
| appModelID | No | String | Application scenario model ID, maximum of 64 bytes | } |
| resourceID | Yes | String | resource ID, maximum of 32 bytes | |
| methodType | No | Short | Calculation method,<br>1: on-line resources;<br>2: off-line resources | |
| resourceType | No | String | Resource type, maximum of 32 bytes, such as CPU, GPU, FPGA, SPARK . . . | Response |
| 3. response content | | | | { |
| parameter name | required or not | parameter type | parameter description | "processcode":O,<br>"processInfo":"OK" |
| processCode | Yes | UInt | Feedback information, as seen in the definition of status measurement framework | } |
| processInfo | No | String | feedback information descripiton, maximum of 512 bytes | |
| exInfo | No | String | extended response information, JSON format | |

An example of face recognition model training and prediction in an AI intelligentialization process is described in this disclosure, but it should be understood that the application scenario of this disclosure is not limited to this. The improved scheme proposed by the present disclosure can be applied to any AI intelligentialization process, especially a process of at least one application operation with the same configuration performed during such as the model training stage and the model utilization stage, such as processes of object tracking, object detection, and so on.

It should be noted that the above description is only exemplary. The embodiments of the present disclosure can also be executed in any other appropriate manner, and the advantageous effects obtained by the embodiments of the present disclosure can still be achieved. Moreover, the embodiments of the present disclosure can also be applied to other similar application examples, and the advantageous effects obtained by the embodiments of the present disclosure can still be achieved. It should be understood that machine-executable instructions in the machine-readable storage medium or program product according to the embodiments of the present disclosure may be configured to perform operations corresponding to the above-mentioned device and method embodiments. When referring to the above embodiments of the device and method, the embodiments of the machine-readable storage medium or the program product are clear to those skilled in the art, and therefore will not be described repeatedly. Machine-readable storage media and program products for carrying or including the aforementioned machine-executable instructions also fall within the scope of the present disclosure. Such a storage medium may include, but is not limited to, a floppy disk, an optical disk, a magneto-optical disk, a memory card, a memory stick, and the like.

Figure 10:
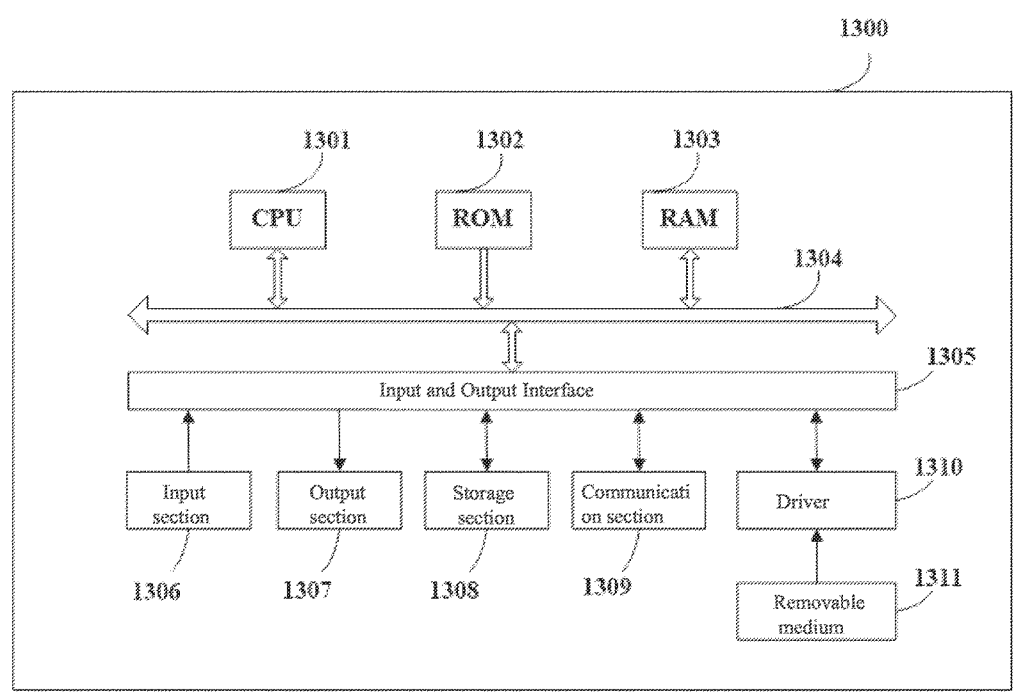
FIG. 10 illustrates an outline of a computer system in which embodiments according to the present disclosure may be implemented.

In addition, it should be understood that the series of processes and devices as described above may also be implemented by software and/or firmware. In the case of being implemented by software and/or firmware, a corresponding program constituting the corresponding software is stored in a storage medium of the related device, and when the program is executed, various functions can be achieved. As an example, a program constituting the software can be installed from a storage medium or a network to a computer having a dedicated hardware structure, such as a general-purpose computer 1300 shown in FIG. 10, and the computer is capable of executing various functions and so on when various programs are installed. FIG. 10 is a block diagram showing an exemplary structure of a computer as an example of an information processing apparatus that can be employed in an embodiment according to the present disclosure. In one example, the computer may correspond to the above-described exemplary electronic device on the AI platform side or the electronic device on the application side according to the present disclosure.

In FIG. 10, a central processing unit (CPU) 1301 performs various processes according to a program stored in a read only memory (ROM) 1302 or a program loaded from a storage section 1308 to a random access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: the input section 1306 including a keyboard, a mouse, etc.; the output section 1307 including a display, such as a cathode ray tube (CRT), a liquid crystal display (LCD), etc. and a speaker, etc.; the storage section 1308 including hard disks, etc.; and communication section 1309 including network interface cards such as LAN cards, modems, etc. The communication section 1309 performs communication processing via a network such as the Internet.

The driver 1310 can also be connected to the input/output interface 1305 as needed. The removable medium 1311 such as a magnetic disk, an optical disk, a magneto-optical disk, a semiconductor memory, etc. is installed on the driver 1310 as needed, so that a computer program read out therefrom is installed into the storage section 1308 as needed.

In the case where the above-mentioned series of processing is realized by software, a program constituting the software is installed from a network such as the Internet or a storage medium such as a removable medium 1311.

Those skilled in the art should understand that a storage medium is not limited to the removable medium 1311 shown in FIG. 10 in which the program is stored and which is distributed separately from the device to provide the program to the user. Examples of removable media 1311 include magnetic disks (including floppy disks), optical disks (including CD-ROMs and digital versatile disks (DVDs)), magneto-optical disks (including mini disks (MD) (TM)) and semiconductor memory. Alternatively, the storage medium may be ROM 1302, a hard disk included in the storage portion 1308, and the like, in which programs are stored, and are distributed to users along with the device containing them.

In addition, it should be understood that multiple functions included in one unit in the above embodiments may be implemented by separate devices. Alternatively, multiple functions implemented by multiple units in the above embodiments may be implemented by separate devices, respectively. In addition, one of the above functions can be implemented by multiple units. Needless to say, such configuration is included in the technical scope of the present disclosure.

Herein, the steps illustrated in the flowchart include not only processes performed in the described order in time series, but also processes performed in parallel or individually instead of having to be performed in time series. Further, even in the steps processed in time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Moreover, the terms "including", "comprising", or any other variation thereof, of the embodiments of the present disclosure are intended to cover non-exclusive inclusion, so that a process, method, article, or device that includes a series of elements includes not only those elements, but includes other elements not explicitly listed, or also elements inherent to such a process, method, article, or device. Without more restrictions, the elements defined by the sentence "including a . . . " do not exclude a case that in the process, method, article, or device that includes the elements, other identical elements exist.

Although some specific embodiments of the present disclosure have been described in detail, those skilled in the art should understand that the above embodiments are merely illustrative and do not limit the scope of the present disclosure. Those skilled in the art should understand that the above embodiments may be combined, modified, or replaced without departing from the scope and essence of the present disclosure. The scope of the present disclosure is defined by the appended claims.

What claimed is that:

1. An electronic device on an artificial intelligence (AI) platform side, the AI platform is capable of interacting with an application side to perform at least one AI intelligentialization process with the same application configuration, the electronic device includes a processing circuitry which is configured to:
    receive a configuration request for the at least one AI intelligentialization process from an application side, the configuration request including information indicating the application configuration; and
    when the application configuration is satisfied, assign the application configuration for usage by the at least one AI intelligentialization process during execution;
    wherein the processing circuitry is further configured to, when the requested application configuration is satisfied, feedback to the application side information that indicates that the requested application configuration is satisfied, so that the application side, upon receipt of the information, can request to perform the at least one AI intelligentialization process without submitting a configuration request for each AI intelligentialization process; and
    wherein the processing circuitry is further configured to, upon receipt of a request from the application side for executing the at least one AI intelligentialization process, execute the at least one AI intelligentialization process by directly using the application configuration that has been assigned to the at least one AI intelligentialization process.

2. The electronic device according to claim 1, wherein the application configuration includes at least one of:
    a resource configuration, and the information indicating the application configuration indicates resources required to execute the at least one AI intelligentialization process; or
    a model configuration, and the information indicating the application configuration indicates a model required to execute the at least one AI intelligentialization process.

3. The electronic device according to claim 1, wherein the processing circuitry is further configured to, in a case where resource configuration included in the configuration information is not satisfied, provide information indicating currently available resources in the resource pool to the application side, so that the application side perform resource configuration adjustment.

4. The electronic device according to claim 1, wherein the processing circuitry is configured to perform resource allocation for the at least one AI intelligentialization process according to specific information in the configuration request related to resource configuration adjustment.

5. The electronic device according to claim 4, wherein the specific information related to the resource configuration adjustment includes resource adjustment strategy information, and the processing circuitry is configured to, in a case where resource configuration indicated in the configuration request is not satisfied, allocate resources for the at least one AI intelligentialization process according to resource configuration corresponding to the resource adjustment strategy information.

6. The electronic device according to claim 4, wherein the specific information related to the resource configuration adjustment includes priority information of the AI intelligentialization process, and the processing circuitry is configured to execute resource allocation for the AI intelligentialization process according to the priority information.

7. The electronic device according to claim 1, wherein the processing circuitry is further configured to:
provide status monitoring information in response information from the electronic device on the AI platform side, wherein the status monitoring information includes coded information related to AI intelligentialization status when an abnormity occurs, and the AI intelligentialization status may include at least one of a type of the abnormity, an application scenario in which the abnormity occurs, and an operation phase in which the abnormity occurs.

8. The electronic device according to claim 1, wherein processing circuitry is further configured to:
receive an application resource release request from an electronic device on the application side,
release resources for the at least one AI intelligentialization process, and
notify the application side of the release result as a response.

9. An application-side electronic device, the application side is capable of performing signaling interaction with an artificial intelligence (AI) platform side to perform at least one AI intelligentialization process with the same application configuration, the application-side electronic device including a processing circuitry which is configured to
send an electronic device on the AI platform side a configuration request for the at least one AI intelligentialization process, the configuration request including information indicating the application configuration,
receive response information from the electronic device on the AI platform side indicating that the application configuration is satisfied, and
send an operation request to the electronic device on the AI platform side to perform the at least one AI intelligentialization process without any further configuration request; and
wherein, upon receipt of a request from the application side for executing the at least one AI intelligentialization process, the electronic device on the AI platform side executes the at least one AI intelligentialization process by directly using the application configuration that has been assigned to the at least one AI intelligentialization process.

10. The electronic device according to claim 9, wherein the processing circuitry is further configured to
receive information indicating that the resource configuration included in the application configuration cannot be satisfied from the electronic device on the AI platform side and information indicating currently available resources in the resource pool,
perform resource configuration adjustment, and
send the adjusted resource configuration to the electronic device on the AI platform side via a configuration request.

11. The electronic device according to claim 9, wherein the processing circuitry is further configured to:
receive status monitoring information from the electronic device on the AI platform side, where the status monitoring information includes coded information related to an AI intelligentialization status when an abnormity occurs, and the AI intelligentialization status may include at least one of a type of the abnormity, an application scenario in which the abnormity occurs, an operation stage in which the abnormity occurs, and
analyze the status monitoring information to identify and recover from the abnormity.

12. The electronic device according to claim 9, wherein the processing circuitry is further configured to:
send a resource release request to the electronic device on the AI platform side, and
receive a release result from the electronic device on the AI platform side.

13. The non-transitory electronic device according to claim 9, wherein the processing circuitry is further configured to:
send an electronic device on the AI platform side the configuration request for the at least one AI intelligentialization process including specific information related to resource configuration adjustment, so that the electronic device on the AI platform side can perform resource allocation for the at least one AI intelligentialization process according to the specific information, and
wherein the specific information related to the resource configuration adjustment includes resource adjustment strategy information or priority information of the AI intelligentialization process.

14. A non-transitory computer-readable storage medium storing instructions that, when executed by one or more processors, cause performance of a method on an artificial intelligence (AI) platform side, the AI platform is capable of interacting with an application side to perform at least one AI intelligentialization process with the same application configuration, the method comprises:
a receiving step of receiving a configuration request for the at least one AI intelligentialization process from an application side, the configuration request including information indicating the application configuration; and
an assigning step of, when the application configuration is satisfied, assigning the application configuration for usage by the at least one AI intelligentialization process during execution, wherein the instructions that, when executed by one or more processors, cause performance of the following;
when the requested application configuration is satisfied feedbacking to the application side information that indicates that the requested application configuration is satisfied, so that the application side, upon receipt of the information, requests to perform the at least one AI intelligentialization process without submitting a configuration request for each AI intelligentialization process; and upon receipt of a request from the application side for executing the at least on AI intelligentialization process, the AI platform side executes the at east one AI intelligentialization process by directly using the application configuration that has been assigned to the at least one AI intelligentialization process.

15. The non-transitory computer-readable storage medium according to claim 14, wherein the instructions that, when executed by one or more processors, cause performance of the following:

in a case where resource configuration included in the configuration information is not satisfied, providing information indicating currently available resources in the resource pool to the application side, so that the application side perform resource configuration adjustment.

16. The non-transitory computer-readable storage medium according to claim 14, wherein the instructions that, when executed by one or more processors, cause performance of the following:

performing resource allocation for the at least one AI intelligentialization process according to specific information in the configuration request related to resource configuration adjustment, and wherein the specific information related to the resource configuration adjustment includes resource adjustment strategy information or priority information of the AI intelligentialization process.

17. The non-transitory computer-readable storage medium according to claim 14, wherein the instructions that, when executed by one or more processors, cause performance of the following:

receiving an application resource release request from an electronic device on the application side, releasing resources for the at least one AI intelligentialization process, and notifying the application side of the release result as a response.

* * * * *